(12) United States Patent
Oyanagi et al.

(10) Patent No.: US 9,792,031 B2
(45) Date of Patent: Oct. 17, 2017

(54) SCROLL SPEED ADJUSTMENT

(71) Applicant: INTERNATIONAL BUSINESS MACHINES CORPORATION, Armonk, NY (US)

(72) Inventors: Chikako Oyanagi, Tokyo (JP); Akira Saito, Chiba (JP)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 14/061,290

(22) Filed: Oct. 23, 2013

(65) Prior Publication Data

US 2014/0181733 A1 Jun. 26, 2014

(30) Foreign Application Priority Data

Dec. 21, 2012 (JP) ................................ 2012-280183

(51) Int. Cl.
*G06F 3/048* (2013.01)
*G06F 3/0485* (2013.01)
*G06F 3/0488* (2013.01)

(52) U.S. Cl.
CPC .......... *G06F 3/0485* (2013.01); *G06F 3/0488* (2013.01); *G06F 3/04883* (2013.01); *G06F 3/04886* (2013.01)

(58) Field of Classification Search
CPC .. G06F 3/0485; G06F 3/0488; G06F 3/04883; G06F 3/04886
USPC ........................................................ 715/785
See application file for complete search history.

(56) References Cited

U.S. PATENT DOCUMENTS

| 6,337,694 | B1* | 1/2002 | Becker ................ G06F 3/04855 |
| | | | 345/684 |
| 7,552,387 | B2* | 6/2009 | Shen ................. G06F 17/30796 |
| | | | 715/716 |
| 2002/0120537 | A1* | 8/2002 | Morea ..................... G06Q 30/02 |
| | | | 705/35 |
| 2002/0171691 | A1 | 11/2002 | Currans et al. |
| 2006/0246940 | A1* | 11/2006 | Foxenland ............ G06F 3/0485 |
| | | | 455/550.1 |
| 2006/0268020 | A1* | 11/2006 | Han ...................... G06F 3/0485 |
| | | | 345/684 |
| 2008/0155461 | A1 | 6/2008 | Ozaki |

(Continued)

FOREIGN PATENT DOCUMENTS

| CN | 102037438 A | 4/2011 |
| CN | 102156555 A | 8/2011 |

(Continued)

OTHER PUBLICATIONS

International Searching Authority, International Application No. PCT/JP2013/078340, Written Opinion, Dec. 3, 2013, pp. 1-10.

*Primary Examiner* — William Bashore
*Assistant Examiner* — Gregory A Distefano
(74) *Attorney, Agent, or Firm* — Law Office of Jim Boice

(57) ABSTRACT

An apparatus comprises: a display unit for displaying a target image; an operation input unit to which a scroll operation for scrolling the target image displayed on the display unit is input; a display control unit for scrolling the target image according to the scroll operation; and a speed setting unit for changing, according to an area acceleration associated with a set area provided in the target image, a scroll speed at which the target image is scrolled.

19 Claims, 14 Drawing Sheets

(56) References Cited

U.S. PATENT DOCUMENTS

| | | | |
|---|---|---|---|
| 2010/0138776 A1* | 6/2010 | Korhonen | G06F 3/04883 715/786 |
| 2010/0164895 A1* | 7/2010 | Kim | G06F 3/0488 345/173 |
| 2010/0277496 A1 | 11/2010 | Kawanishi et al. | |
| 2011/0055775 A1 | 3/2011 | Saito et al. | |
| 2011/0099509 A1 | 4/2011 | Horagai | |
| 2011/0252362 A1* | 10/2011 | Cho | G06F 3/0485 715/784 |
| 2012/0167002 A1* | 6/2012 | Torigoe | G06F 3/0488 715/784 |
| 2012/0274665 A1* | 11/2012 | Shimizu | G06F 3/0485 345/684 |
| 2013/0268883 A1* | 10/2013 | Kim | G06F 3/0485 715/784 |

FOREIGN PATENT DOCUMENTS

| | | |
|---|---|---|
| CN | 102760039 A | 10/2012 |
| JP | 09138732 | 5/1997 |
| JP | 2001-282414 | 10/2001 |
| JP | 2001-306293 | 11/2001 |
| JP | 2003-58511 A | 2/2003 |
| JP | 2008-157974 A | 7/2008 |
| JP | 2009241924 | 10/2009 |
| JP | 2010-146358 | 7/2010 |
| JP | 2010-205155 A | 9/2010 |
| JP | 2011095932 | 5/2011 |
| JP | 2011-127949 | 6/2011 |
| JP | 2011170775 | 9/2011 |
| JP | 2012-230571 A | 11/2012 |
| WO | 2010032402 A1 | 3/2010 |
| WO | 2010058728 A1 | 5/2010 |

* cited by examiner

SCROLL SPEED ADJUSTMENT

This application is based on and claims the benefit of priority from Japan (JP) Patent Application 2012-280183, filed on Dec. 21, 2012, and herein incorporated by reference in its entirety.

BACKGROUND

The present invention relates to a method and/or apparatus for scrolling through a display. More specifically, the present invention relates to selectively controlling a scroll rate on a display.

SUMMARY

In one embodiment of the present invention, an apparatus comprises: a display unit for displaying a target image; an operation input unit to which a scroll operation for scrolling the target image displayed on the display unit is input; a display control unit for scrolling the target image according to the scroll operation; and a speed setting unit for changing, according to an area acceleration associated with a set area provided in the target image, a scroll speed at which the target image is scrolled.

In one embodiment of the present invention, an apparatus comprises: a generation unit generating a target image; and an acceleration setting unit setting a set area in the target image and setting an area acceleration for the set area for changing a scroll speed at which the target image is scrolled.

In one embodiment of the present invention, a computer program product comprises a computer readable storage medium having program code embodied therewith, the program code readable and executable by a processor to perform a method comprising: displaying a target image; receiving an input describing a scroll operation for scrolling the target image displayed on the display unit; and changing, according to an area acceleration associated with a set area provided in the target image, a scroll speed at which the target image is scrolled.

DETAILED DESCRIPTION

While the present invention will be described below with reference to embodiments thereof, the embodiments below are not intended to limit the present invention set forth in the claims. Not all combinations of features described in the embodiments are essential to the solution of the present invention.

A computing apparatus is able to display an image on a display unit. One type of display unit allows a scroll speed on the display unit to be slowed down if a searched-for word from an in-page search processing is located. Unfortunately, this type of display unit/computing apparatus has a problem of uncomfortable scrolling through the target image due to the switching between the two scroll speeds according to these parameters.

Figure 1:
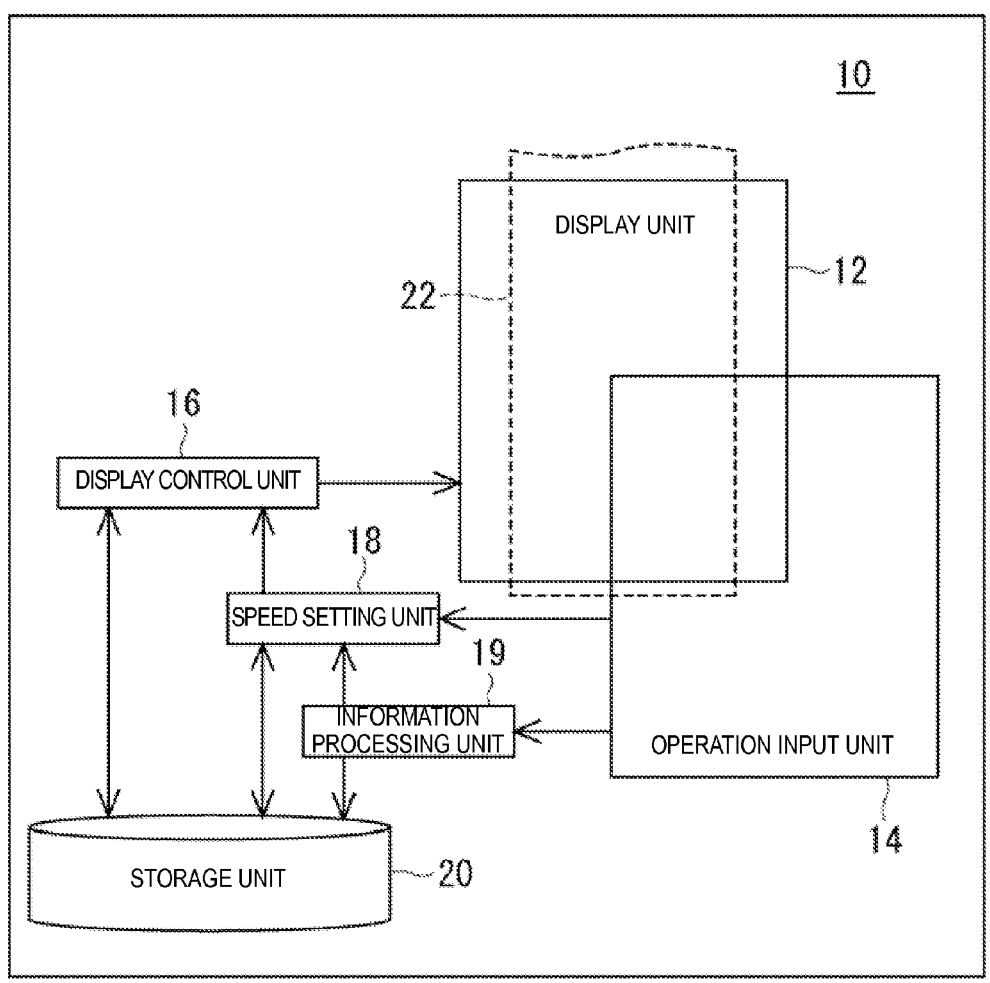
FIG. 1 is an overall configuration diagram of a display apparatus according to an embodiment.

With reference now to the figures, FIG. 1 is an overall configuration diagram of a display apparatus 10 according to an embodiment. In response to a user touching an operation input unit 14 to input an operation such as a flick operation or a touch operation, the display apparatus 10 scrolls a target image 22 displayed on a display unit 12. The display apparatus 10 can set varying area acceleration (AA) for a set area (SA) in the target image 22 to continuously change a scroll speed (SV) depending on the area. The display apparatus 10 may be incorporated in a mobile telephone device such as a smart phone, a mobile information terminal device, or an electronic device having the operation input unit 14. The display apparatus 10 includes the display unit 12, the operation input unit 14, a display control unit 16, a speed setting unit 18, an information processing unit 19, and a storage unit 20.

The display unit 12 displays the target image 22, which may include text, image, or video. An example of the display unit 12 is a liquid crystal display. The display unit 12 can display the target image 22 enlarged or reduced. The display unit 12 can also display only part of the target image 22, in which case the display unit 12 scrolls the target image 22 according to, e.g., the user's operation.

The operation input unit 14 receives an operation that is input by the user. An example of the operation input unit 14 is a touch panel. The operation input unit 14 is provided on the entire surface of the front side of the display unit 12, i.e., the side facing the user. The user therefore inputs an operation through the operation input unit 14 while looking at the target image 22 displayed on the display unit 12.

The operation input unit 14 receives input of a scroll operation for scrolling the target image 22 displayed on the display unit 12. An exemplary scroll operation received by the operation input unit 14 is a flick operation, such that the user touches the operation input unit 14 with the user's finger, slides the finger, and then moves the finger off the operation input unit 14. Another exemplary scroll operation received by the operation input unit 14 is a touch operation, such that the user touches the operation input unit 14 with the user's finger without sliding the finger.

The display control unit 16, the speed setting unit 18, and the information processing unit 19 may be implemented by hardware such as circuits, or by functions of a component such as a CPU having read a program therein, or by combination of the both.

The display control unit 16 controls the display unit 12 to display the target image 22. The display control unit 16 also scrolls the target image 22 displayed on the display unit 12 according to a scroll operation that is input through the operation input unit 14.

The speed setting unit 18 computes the scroll speed SV at which the target image 22 is scrolled. For example, the speed setting unit 18 sets a speed depending on a flick operation as an initial speed FV of the scroll speed SV. The speed setting unit 18 changes the scroll speed SV according to an initial acceleration FA that decelerates the scroll speed SV. The initial acceleration FA decelerates the scroll speed SV. If a set area SA exists in the target image 22, the speed setting unit 18 continuously changes the scroll speed SV according to an area acceleration AA associated with the set area SA. The set area SA is defined by coordinates in the target image 22. For example, in a case of a flick operation, if the set area SA enters an area where a flick operation has been input on the operation input unit 14, the speed setting unit 18 may change the scroll speed SV according to the sum of the initial acceleration FA and the area acceleration AA. If an area where a touch operation has been received on the operation input unit 14 is within the set area SA, the speed setting unit 18 may set the initial speed FV of the scroll speed SV according to the area acceleration AA. Further, if the touch operation is continued within the set area SA, the speed setting unit 18 may change the set scroll speed SV according to the area acceleration AA. The area acceleration AA may be set in advance to be associated with the set area SA in the target image 22, or may be set by the speed setting unit 18 to be associated with the set area SA in the target image 22.

The information processing unit 19 processes information that is input through the operation input unit 14. For example, the information processing unit 19 receives user information that is input through the operation input unit 14, and validates the information. The information processing unit 19 outputs the result of the validation to the storage unit 20 or the speed setting unit 18.

The storage unit 20 stores information necessary for control in the display apparatus 10. For example, the storage unit 20 stores image information on the target image 22, the initial speed FV of the scroll speed SV, and the initial acceleration FA and the area acceleration AA for accelerating and decelerating the scroll speed SV. The initial speed FV may be a single fixed value, or may be multiple values each associated with a flick speed (the moving speed of a flick operation) or associated with an amount of operation. The initial acceleration FA may be a single fixed value, or may be multiple values each associated with a plurality of initial speeds FV. The area acceleration AA is associated with the set area SA. Further, the area acceleration AA includes values associated with coordinates within the set area SA. The information stored in the storage unit 20 includes information, such as the target image 22, externally obtained via, e.g., the Internet.

Figure 2:
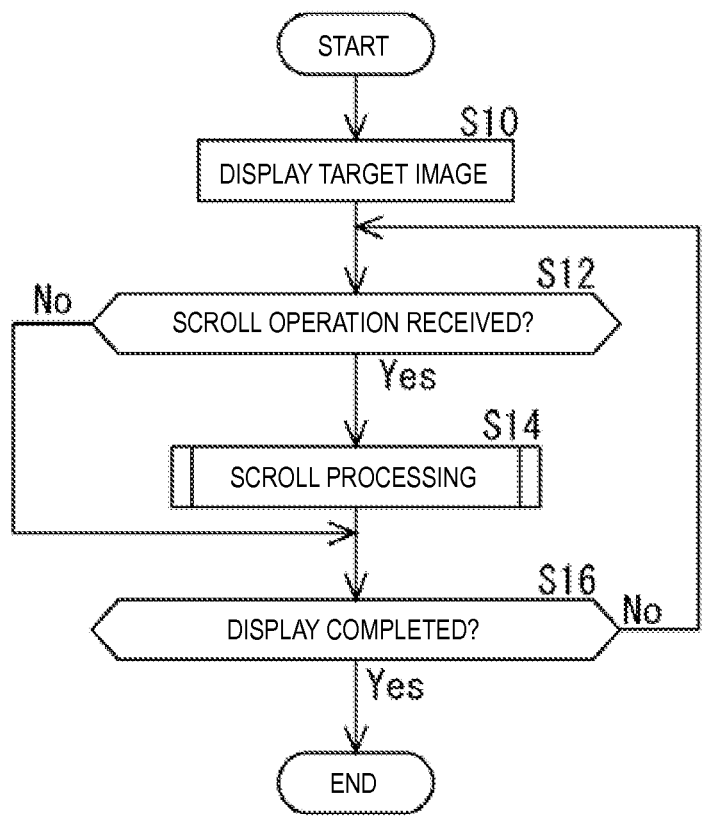
FIG. 2 is a flowchart of image display processing by the display apparatus.

FIG. 2 is a flowchart of image display processing by the display apparatus 10.

As shown in FIG. 2, in the image display processing, the display control unit 16 obtains the image information on the target image 22 from the storage unit 20 and causes the display unit 12 to display the target image 22 (S10). The operation input unit 14 determines whether a user's scroll operation has been received (S12). If the operation input unit 14 determines that the user's scroll operation has not been received (S12: No), processing in step S16 is performed. If the operation input unit 14 determines that the user's scroll operation has been received (S12: Yes), the operation input unit 14 outputs operation information about the scroll operation to the speed setting unit 18. The operation information includes the coordinates of the start point and the end point, and the duration, of the user's touching on the operation input unit 14.

The speed setting unit 18 and the display control unit 16 scroll the target image 22 according to scroll processing to be described below (S14). Thereafter, if the display control unit 16 determines that the display of the target image 22 is not completed (S16: No), the processing in step S12 and subsequent steps is repeated. The display control unit 16 may determine the finish of the display based on the length of time during which no operations are input, or based on a finishing operation that is input through the operation input unit 14. If the display control unit 16 determines that the display of the target image 22 is completed, the display operation terminates (S16: Yes).

Figure 3:
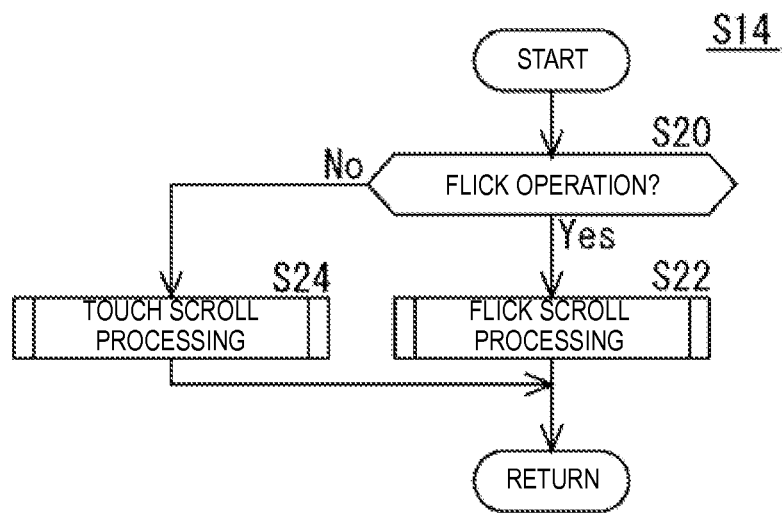
FIG. 3 is a flowchart of scroll processing.

FIG. 3 is a flowchart of the scroll processing S14.

As shown in FIG. 3, in the scroll processing S14, the speed setting unit 18 determines, based on the operation information input from the operation input unit 14, whether the user's operation is a flick operation (S20). If the coordinate of the start point of the user's touching is different from the coordinate of the end point, the speed setting unit 18 determines that the user's operation is a flick operation (S20: Yes). The speed setting unit 18 then performs flick scroll processing (S22) to be described below and returns to the display processing.

If the speed setting unit 18 determines that the user's operation is not a flick operation (S20: No), i.e., determines that the user's operation is a touch operation, the speed setting unit 18 performs touch scroll processing (S24) to be described below and returns to the display processing.

Figure 4:
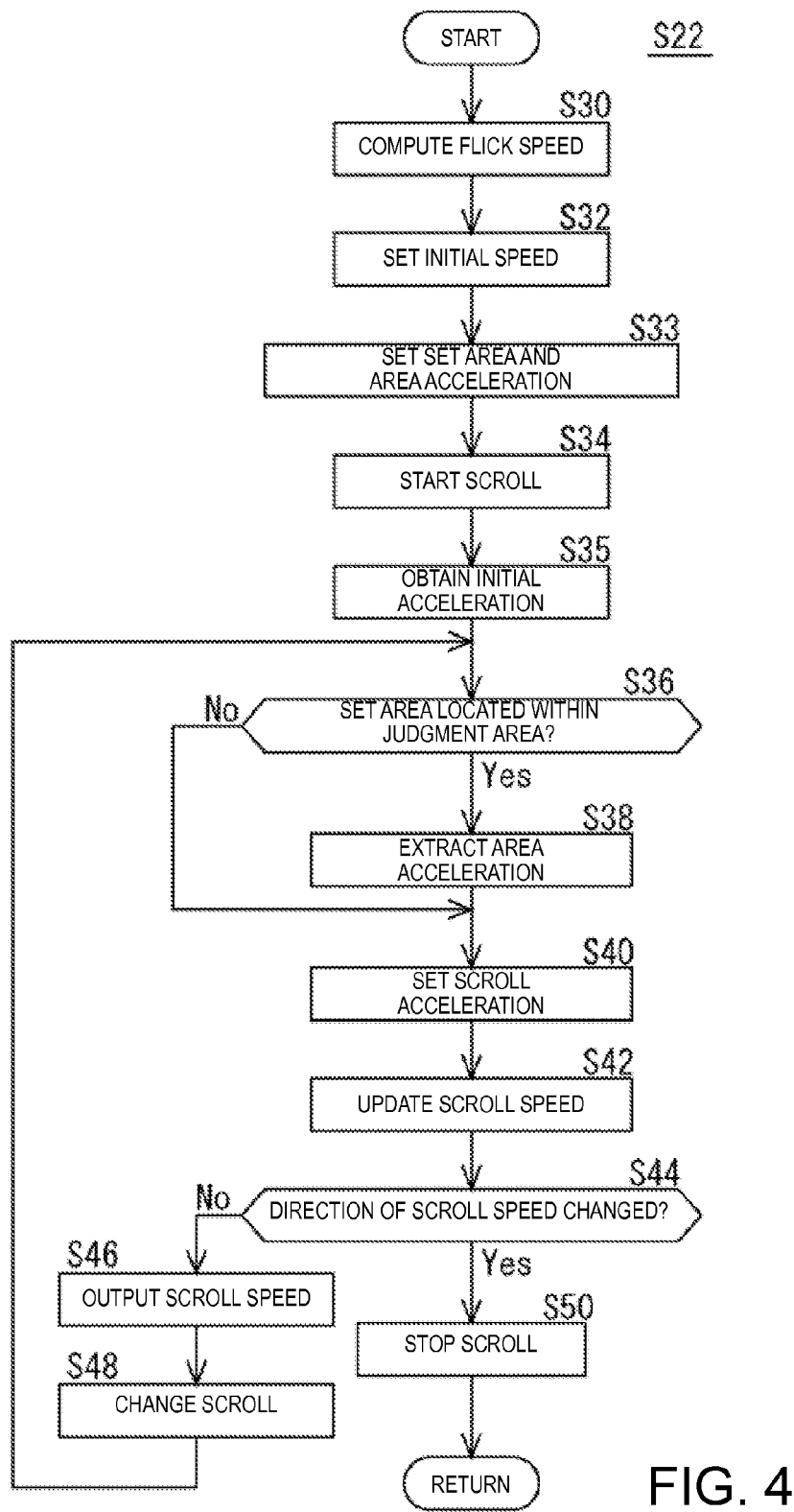
FIG. 4 is a flowchart of flick scroll processing.

FIG. 4 is a flowchart of the flick scroll processing S22.

As shown in FIG. 4, in the flick scroll processing, the speed setting unit 18 computes a flick speed, i.e., the moving speed of the touched position, based on the coordinates of the start point and the end point of the user's touching and the touching duration included in the operation information (S30). Based on the computed flick speed, the speed setting unit 18 sets the initial speed FV of the scroll speed SV of the target image 22 and outputs the initial speed FV to the display control unit 16 (S32). The speed setting unit 18 may compute the initial speed FV based on the flick speed, or may extract the corresponding initial speed FV from an initial speed table stored in the storage unit 20, where the table associates flick speeds with corresponding initial speeds FV. The initial speed FV includes the magnitude of the scroll speed, as well as the scroll direction.

The speed setting unit 18 sets each set area SA in the target image 22 and sets the area acceleration AA for the set area SA (S33). The display control unit 16 starts scrolling the target image 22 at the initial speed FV obtained from the speed setting unit 18 (S34). The speed setting unit 18 obtains the initial acceleration FA of the scroll from the storage unit 20 (S35).

The speed setting unit 18 determines whether the set area SA is within a judgment area JA (S36). An example of the judgment area JA is a certain range centered on the start point or the end point of the user's flick operation. Alternatively, the judgment area JA may be a central portion of the display unit 12. If the speed setting unit 18 determines that the set area SA has reached the judgment area JA with the scroll of the target image 22 (S36: Yes), the speed setting unit 18 extracts the area acceleration AA associated with the set area SA (S38). The extraction of the area acceleration AA will be described below. The speed setting unit 18 computes a scroll acceleration according to the area acceleration AA and the initial acceleration FA and sets the computed scroll acceleration (S40). For example, the speed setting unit 18 sets the scroll acceleration as the sum of the area acceleration AA and the initial acceleration FA.

If the speed setting unit 18 determines that the set area SA has not reached the judgment area JA (S36: No), the speed setting unit 18 skips step S38 and performs step S40. In this case, the speed setting unit 18 sets the scroll acceleration as the initial acceleration FA (S40).

The speed setting unit 18 updates the scroll speed by computing the scroll speed according to the scroll acceleration and the current scroll speed SV (S42). Thus, if the set area SA is within the judgment area JA, the speed setting unit 18 computes the scroll speed according to the scroll acceleration that is the sum of the area acceleration AA and the initial acceleration FA. If the set area SA is not within the judgment area JA, the speed setting unit 18 computes the scroll speed according to the initial acceleration FA.

The speed setting unit 18 determines whether the direction of the scroll speed SV has changed (S44). The direction of the scroll speed SV changes when, for example, the scroll speed SV changes so that the target image 22 being scrolled downward is scrolled upward, for example when the sign of the scroll speed SV is inverted. This determination allows the speed setting unit 18 to prevent the target image 22 from moving up and down relative to the judgment area JA.

If the speed setting unit 18 determines that the direction of the scroll speed SV has not changed (S44: No), the speed setting unit 18 outputs the scroll speed SV to the display control unit 16 (S46). The display control unit 16 receives the scroll speed SV from the speed setting unit 18 and changes the scroll to achieve the scroll speed SV (S48). Then the processing in step S36 and subsequent steps is repeated. If the speed setting unit 18 determines that the direction of the scroll speed SV has changed (S44: Yes), the display control unit 16 stops the scroll of the target image 22 (S50). In this manner, the display control unit 16 stops the scroll upon a change in the direction of the scroll speed SV, i.e., at a scroll speed of substantially "0." Compared with suddenly stopping the scroll, this allows the display control unit 16 to stop the scroll naturally, reducing the user's uncomfortable feeling. The speed setting unit 18 may also delete a slope SL when the scroll is stopped. Thus, the flick scroll processing terminates, and the process returns to step S16 of the display processing.

FIGS. 5, 6, 7, and 8 are diagrams showing a specific display embodiment of the flick scroll processing. In the example shown in FIGS. 5 to 8, the information processing unit 19 validates the user's input. The speed setting unit 18 sets an area containing an incorrect input as the set area SA, and sets the area acceleration AA for the set area SA. In the embodiment of FIGS. 5 to 8, by way of example, the target image 22 scrolls only in the longitudinal directions of the display unit 12.

Figure 5:
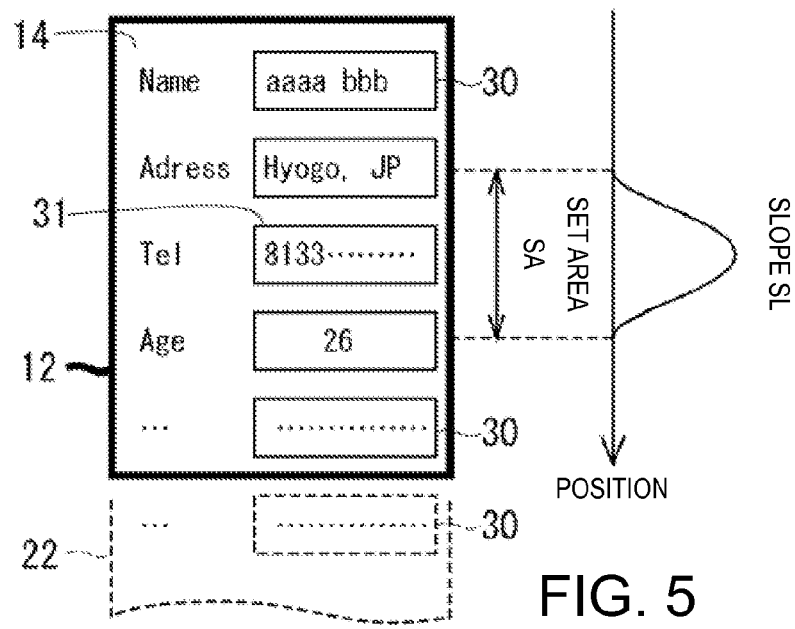
FIG. 5 is a diagram showing a specific display embodiment of the flick scroll processing.

In the example shown in FIG. 5, the display control unit 16 causes the display unit 12 to display an input form as the target image 22. The input form includes fields 30 for entering input information through the operation input unit 14, such as a name field, an address field, a telephone number field 31, and an age field. Since the input form is larger than the display screen of the display unit 12, part of the input form is not displayed on the display unit 12. In the example shown in FIG. 5, the information processing unit 19 determines that input information on a telephone number is incorrect. The information processing unit 19 notifies the speed setting unit 18 that the input information on the telephone number is incorrect. If the input form is obtained by the display apparatus 10 from an external server apparatus via, e.g., the Internet, the server apparatus may validate the input information. In that case, the speed setting unit 18 may obtain information on a field 30 containing incorrect information from the server apparatus. The speed setting unit 18 thus sets an area covering the telephone number field 31 as the set area SA. The speed setting unit 18 may modify the range of the set area SA as appropriate. For example, the speed setting unit 18 may set the set area SA to fit into the telephone number field 31, or to be centered on the telephone number field 31 with the same size as the display unit 12. The speed setting unit 18 further sets the virtual slope SL indicating the area acceleration AA and associated with the set area SA, as shown on the right of the display unit 12 in FIG. 5. The position in the graph of the slope SL indicates the position within the target image 22. If more than one field 30 contains incorrect input information, the speed setting unit 18 sets the slope SL for each such field 30. The angle of gradient of the slope SL indicates the magnitude of the area acceleration AA. The rising segment of the slope SL suggests that the area acceleration AA decelerates the scroll speed SV, whereas the falling segment of the slope SL suggests that the area acceleration AA accelerates the scroll speed SV. The speed setting unit 18 may set the shape of the slope SL as appropriate, and may store the shape of the slope SL in the storage unit 20 in advance. The shape of the slope SL may be a straight line that can be represented by a linear function, or may be a curve, such as a parabola, that can be represented by a quadratic or higher-order function. The set area SA and the area acceleration AA may also be set by, e.g., the server apparatus that has validated the input information. The speed setting unit 18 computes the area acceleration AA for each coordinate in the set area SA based on the angle of gradient of the slope SL.

Figure 6:
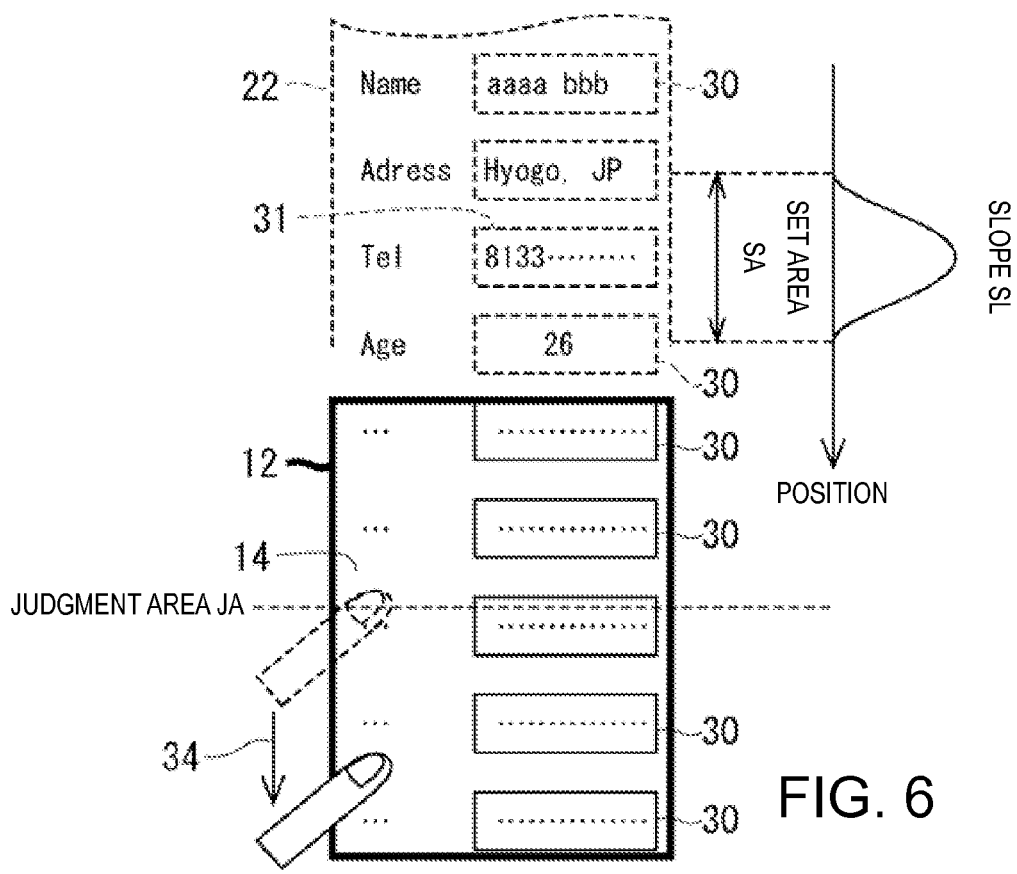
FIG. 6 is a diagram showing the specific display embodiment of the flick scroll processing.

As shown in FIG. 6, the display control unit 16 initially does not display the telephone number field 31, which is located outside the display unit 12. In this state, the user slides the user's finger FN on the operation input unit 14 from a position represented by dotted lines to a position represented by solid lines along an arrow 34. The operation input unit 14 receives the user's input as a flick operation. The speed setting unit 18 is notified of the input of the flick operation by the operation input unit 14, and computes the scroll speed SV and outputs it to the display control unit 16. The speed setting unit 18 also sets, as the judgment area JA, the start point of the touching of the finger FN obtained from the operation input unit 14. This judgment area JA is an example of the area where the flick operation has been input. The judgment area JA may be the end point of the touching of the finger FN or may be the center of the display unit 12. Although the speed setting unit 18 does not set the width of the scroll directions for the judgment area JA in the example shown in FIG. 6, the width may be set for the judgment area JA. The judgment area JA is fixed with respect to the display unit 12 and is therefore not moved with the scroll of the target image 22. The display control unit 16 receives the scroll speed SV from the speed setting unit 18 and scrolls the input form, i.e., the target image 22, in the sliding direction of the finger FN. With the scroll, the set area SA and the slope SL move along with the target image 22. Here, the speed setting unit 18 updates the scroll speed SV, which is initially the initial speed FV, while decelerating the scroll speed SV according to the initial acceleration FA.

Figure 7:
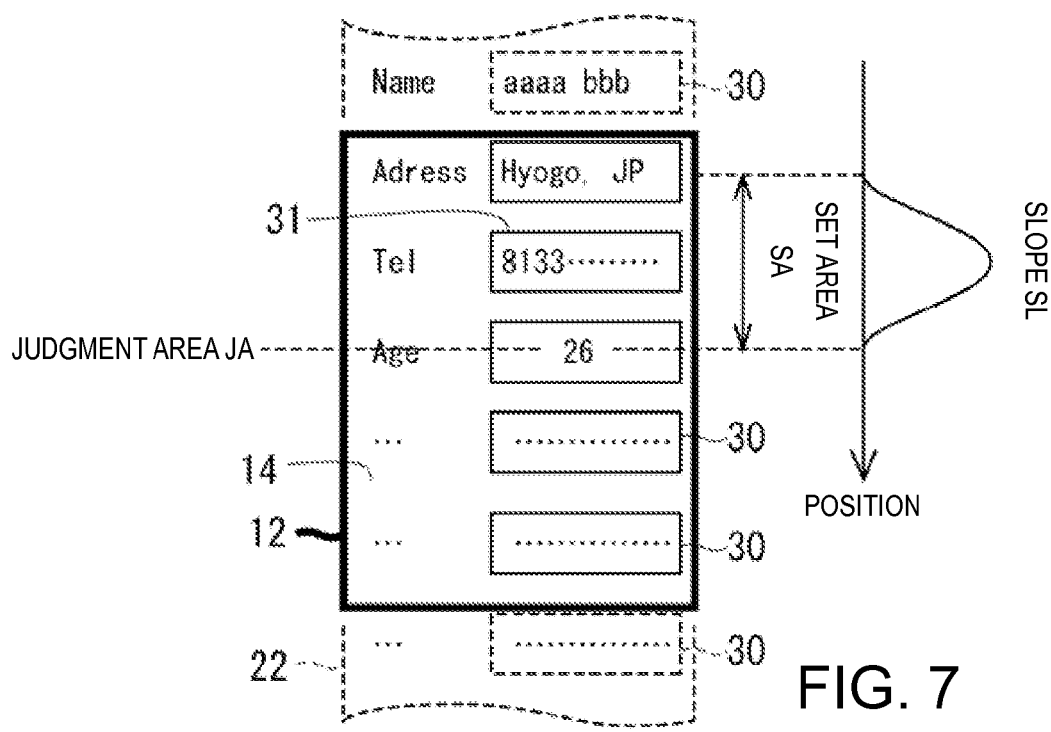
FIG. 7 is a diagram showing the specific display embodiment of the flick scroll processing.

Thereafter, as shown in FIG. 7, when the set area SA scrolling along with the target image 22 reaches the judgment area JA, the speed setting unit 18 extracts the area acceleration AA from the slope SL set for the set area SA. The slope SL rises over a certain range after the judgment area JA is reached. Therefore, after the judgment area JA is reached, the area acceleration AA takes values that decelerate the scroll speed SV toward the telephone number field 31. Accordingly, in addition to the initial acceleration FA, the area acceleration AA also decelerates the scroll speed. As a result, in response to the set area SA reaching the judgment area JA, the speed setting unit 18 increases the deceleration of the scroll speed SV toward the telephone number field 31 containing the incorrect input information. The display control unit 16 therefore displays the telephone number field 31 that is going to pass the judgment area JA while scrolling the field at a very low speed. Here, the speed setting unit 18 may set the scroll speed SV to "0" in response a stop operation that is input by the user through the operation input unit 14 with, e.g., a touch operation. This causes the display control unit 16 to stop the scroll. Thus, the display apparatus 10 can scroll the telephone number field 31 at a very low scroll speed SV to facilitate recognition by the user, and then stop the scroll.

Figure 8:
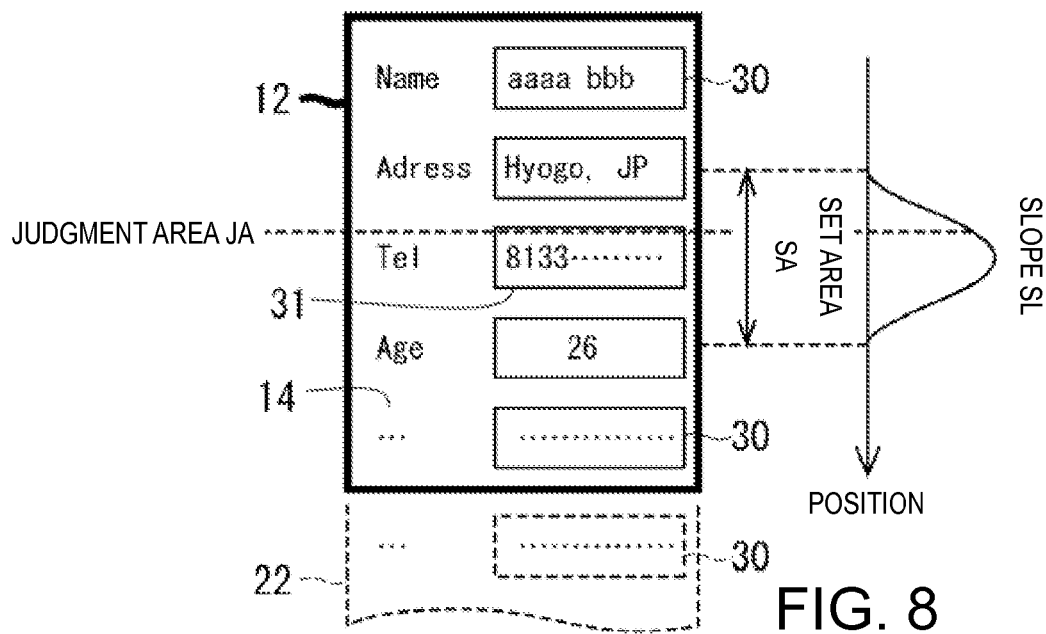
FIG. 8 is a diagram showing the specific display embodiment in the flick scroll processing.

Thereafter, as shown in FIG. 8, when the target image 22 further scrolls and the vertex of the slope SL passes the judgment area JA, the slope SL for the set area SA begins to fall. Accordingly, the area acceleration AA accelerates the scroll speed. Since the speed setting unit 18 sets the scroll speed SV according to the sum of the initial speed FV and the area acceleration AA, the deceleration of the scroll speed SV is decreased or the scroll speed SV is accelerated. The display control unit 16 scrolls the target image 22 at the scroll speed SV computed by the speed setting unit 18 until the scroll speed SV becomes "0" according to the initial acceleration FA. If the speed setting unit 18 determines that the direction of the scroll speed SV has changed, the display control unit 16 stops the scroll without the user's operation.

Figure 9:
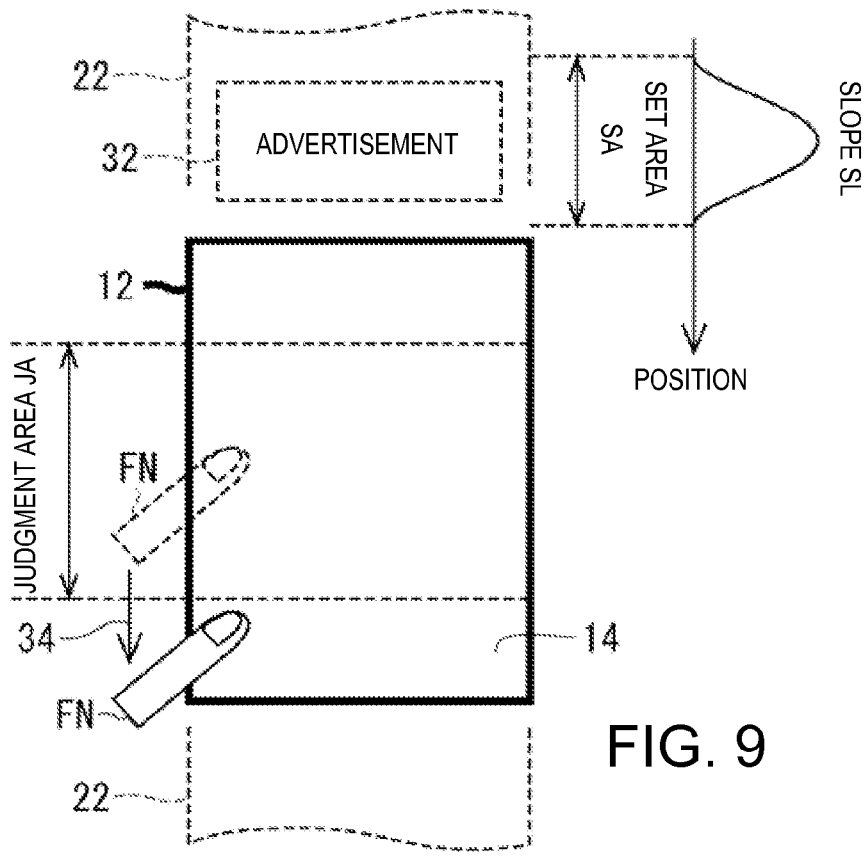
FIG. 9 is a diagram showing another specific display embodiment of the flick scroll processing.
Figure 10:
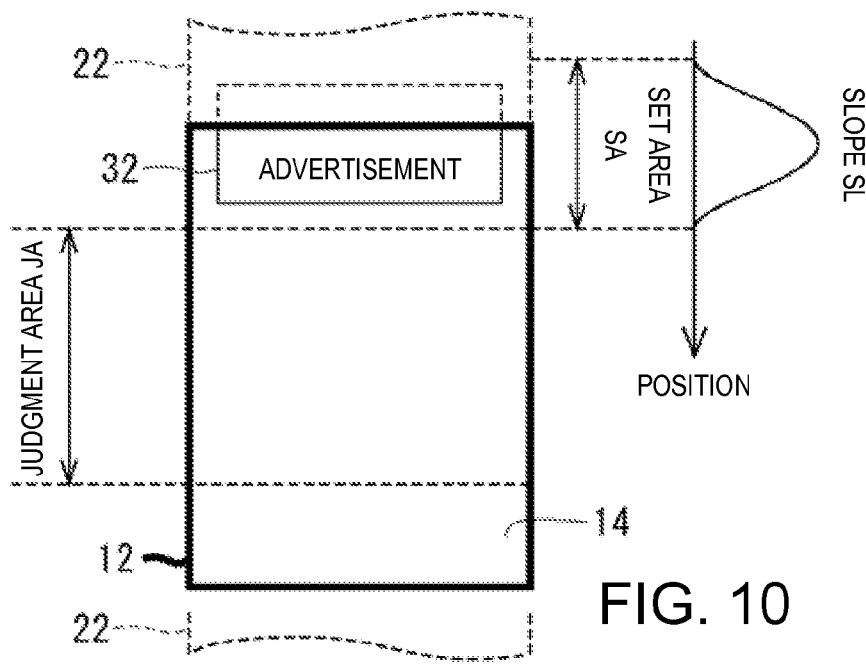
FIG. 10 is a diagram showing the other specific display embodiment of the flick scroll processing.

FIGS. 9 and 10 are diagrams showing another specific display embodiment of the flick scroll processing. With reference to FIGS. 9 and 10, an example will be described in which the speed setting unit 18 scrolls based on the area acceleration AA associated with the set area SA covering an advertisement 32. In the embodiment of FIGS. 9 and 10, the target image 22 scrolls only in the longitudinal directions of the display unit 12.

As shown in FIG. 9, the display control unit 16 causes the display unit 12 to display part of the target image 22 containing the advertisement 32. An example of the target image 22 is a website browsed via the Internet. In the state shown in FIG. 9, the display control unit 16 does not display on the display unit 12 the advertisement 32, which is located outside the display unit 12. The speed setting unit 18 sets the judgment area JA in a central portion of the display unit 12 in the scroll directions. Although the judgment area JA is described as a portion of the display unit 12, the judgment area JA may be the entire area of the display unit 12. As described above, the speed setting unit 18 may also set the judgment area JA at the start point or the end point of a flick operation. The speed setting unit 18 sets the set area SA associated with the advertisement 32. In the example shown in FIG. 9, the speed setting unit 18 sets the set area SA centered on the advertisement 32 with the length longer than the length of the advertisement 32 in the scroll directions. In this state, the user inputs a flick operation by sliding the user's finger FN on the operation input unit 14 in the direction indicated by an arrow 34. The display control unit 16 then scrolls the target image 22 in the direction of the flick operation. With the scroll, the speed setting unit 18 moves the set area SA and the slope SL along with the target image 22.

As shown in FIG. 10, when the speed setting unit 18 determines that the set area SA reaches the judgment area JA, the speed setting unit 18 extracts the area acceleration AA from the slope SL. The speed setting unit 18 sets the scroll acceleration as the sum of the initial acceleration FA and the area acceleration AA. Since the speed setting unit 18 computes the scroll speed SV according to this scroll acceleration, the deceleration of the scroll speed SV of the target image 22 containing the advertisement 32 on the display unit 12 is increased, compared with the deceleration when the set area SA is outside the judgment area JA. Thus, the display apparatus 10 can show the user the advertisement 32 scrolling at a low speed. Thereafter, when the center of the set area SA passes the judgment area JA, the direction of the gradient of the slope SL changes and therefore the speed setting unit 18 reduces the deceleration of the scroll speed SV or accelerates the scroll speed SV. When the center of the set area SA passes the judgment area JA, the speed setting unit 18 may also delete the slope SL, and stop the scroll by setting the scroll speed SV to "0."

Figure 11:
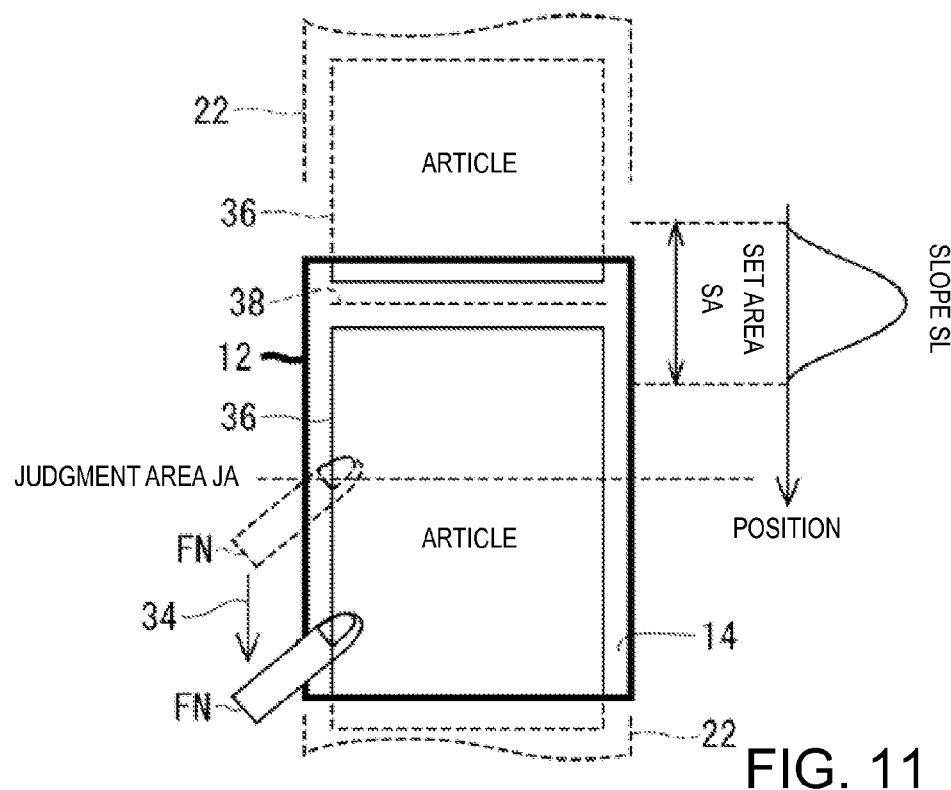
FIG. 11 is a diagram showing still another specific display embodiment of the flick scroll processing.
Figure 12:
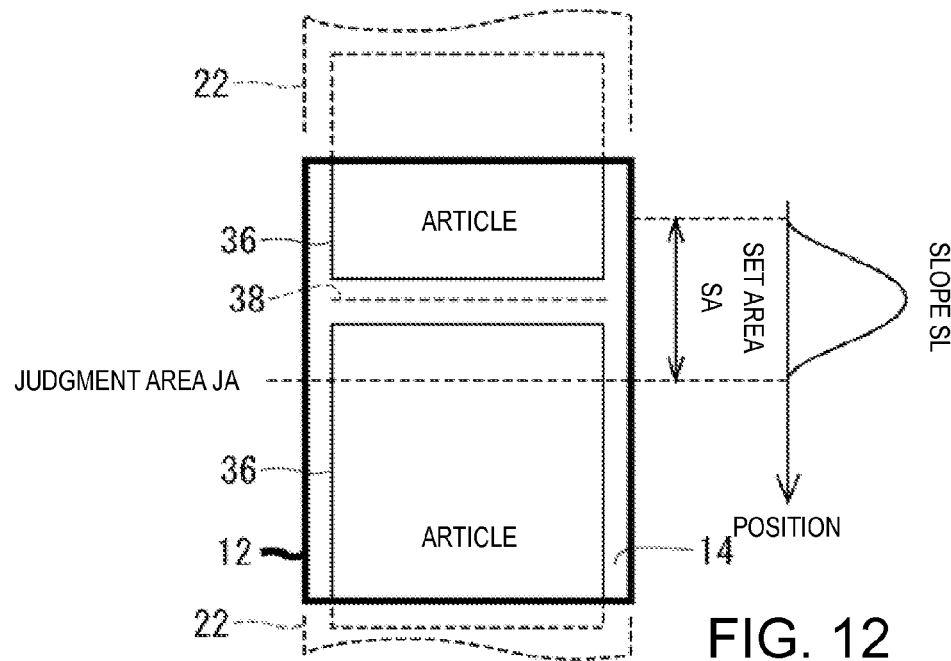
FIG. 12 is a diagram showing the still other specific display embodiment of the flick scroll processing.

FIGS. 11 and 12 are diagrams showing still another specific display embodiment of the flick scroll processing. With reference to FIGS. 11 and 12, an example will be described in which the speed setting unit 18 scrolls based on the area acceleration AA associated with the target image 22 containing articles 36 and a separation line 38 separating the articles 36. In the embodiment of FIGS. 11 and 12, the target image 22 scrolls only in the longitudinal directions of the display unit 12.

As shown in FIG. 11, part of the target image 22 containing the articles 36 is displayed on the display unit 12. An example of the target image 22 is a news website browsed via the Internet. The speed setting unit 18 sets the set area SA centered on the separation line 38 and extending in the scroll directions. The speed setting unit 18 also sets the slope SL associated with the set area SA for computing the area acceleration AA. Alternatively, a server apparatus that provides the website may set the set area SA and the area acceleration AA. In this state, the user inputs a flick operation by sliding the user's finger FN on the operation input unit 14 in the direction indicated by an arrow 34. The display control unit 16 then scrolls the target image 22 in the direction of the flick operation. With the scroll, the speed setting unit 18 moves the set area SA and the slope SL along with the target image 22. The speed setting unit 18 sets the judgment area JA at the start point of the flick operation in the scroll directions.

As shown in FIG. 12, when the speed setting unit 18 determines that the set area SA reaches the judgment area JA, the speed setting unit 18 extracts the area acceleration AA from the slope SL. The speed setting unit 18 computes the scroll acceleration according to the sum of the initial acceleration FA and the area acceleration AA. Since the speed setting unit 18 computes the scroll speed SV according to the scroll acceleration, the deceleration of the scroll speed SV of the target image 22 containing the separation line 38 on the display unit 12 is increased, compared with the deceleration before the set area SA reaches the judgment area JA. Thus, the display apparatus 10 can show the user the articles 36 scrolling at a low speed. Thereafter, when the center of the set area SA passes the judgment area JA, the direction of the gradient of the slope SL changes and therefore the speed setting unit 18 reduces the deceleration of the scroll speed SV or accelerates the scroll speed SV. When the entire set area SA passes the judgment area JA, the speed setting unit 18 may also delete the slope SL, and stop the scroll by setting the scroll speed SV to "0."

Figure 13:
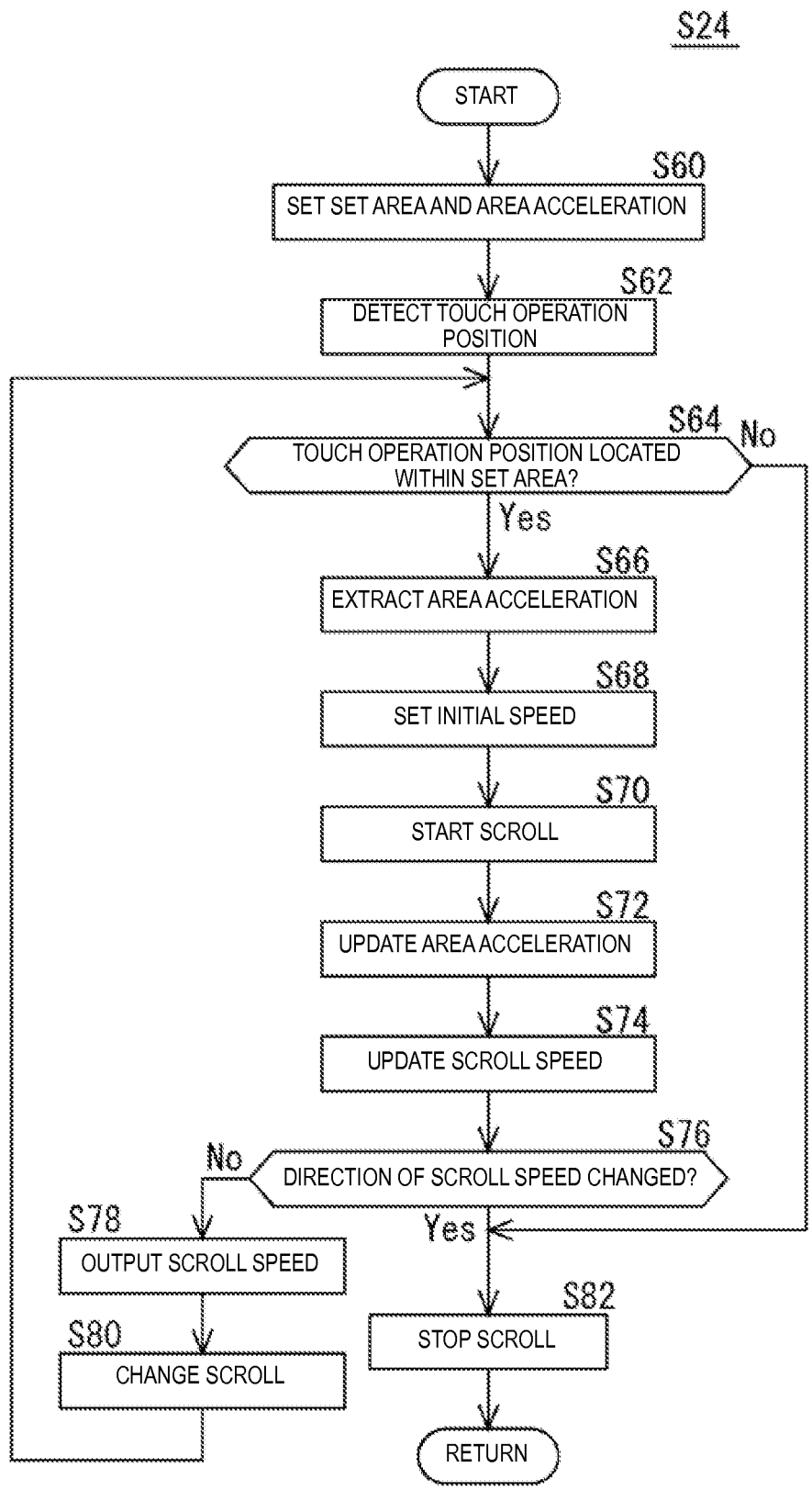
FIG. 13 is a flowchart of touch scroll processing.

FIG. 13 is a flowchart of the touch scroll processing S24.

As shown in FIG. 13, in the touch scroll processing, the speed setting unit 18 sets the set area SA and the area acceleration AA (S60). The setting of the set area SA and the area acceleration AA will be described below.

Based on the operation information received from the operation input unit 14, the speed setting unit 18 detects the coordinate of the area of the touch operation on the operation input unit 14 (S62). The touch operation area may be a point or a range.

The speed setting unit 18 determines whether the touch operation area is within the set area SA (S64). If the speed setting unit 18 determines that the touch operation area is not within the set area SA (S64: No), step S82 is performed.

If the speed setting unit 18 determines that the touch operation area is within the set area SA (S64: Yes), the speed setting unit 18 extracts the area acceleration AA associated with the touch operation area (S66). The speed setting unit 18 sets an initial scroll speed according to the area acceleration AA and outputs the initial scroll speed to the display control unit 16 (S68). In the touch scroll processing, the area acceleration AA is set so that a central portion of the set area SA is moved toward the touch operation area.

The display control unit 16 starts scrolling the target image 22 (S70). Since the relative positions of the touch operation area and the set area SA change with the scroll of the target image 22, the area acceleration AA associated with positions in the set area SA changes with the scroll. Accordingly, the speed setting unit 18 updates the area acceleration AA, which is associated with the touch operation area and changes with the scroll (S72). According to the updated area acceleration AA, the speed setting unit 18 computes and updates the scroll speed SV (S74).

If the speed setting unit 18 determines that the direction of the scroll speed SV has not changed (S76: No), the speed setting unit 18 outputs the scroll speed SV to the display control unit 16 (S78). According to the received new scroll speed SV, the display control unit 16 changes the scroll (S80). Thereafter, step S64 and subsequent steps are repeated. It is to be noted that, in step S64, if the user finishes the touch operation by moving the user's finger off the operation input unit 14, the speed setting unit 18 determines that the touch operation area is not within the set area SA (S64: No).

If the speed setting unit 18 determines that the direction of the scroll speed SV has changed (S76: Yes), the display control unit 16 stops the scroll (S82). The speed setting unit 18 may also delete the slope SL when the scroll is stopped. Thus, the touch scroll processing terminates, and the process returns to step S16.

Figure 14:
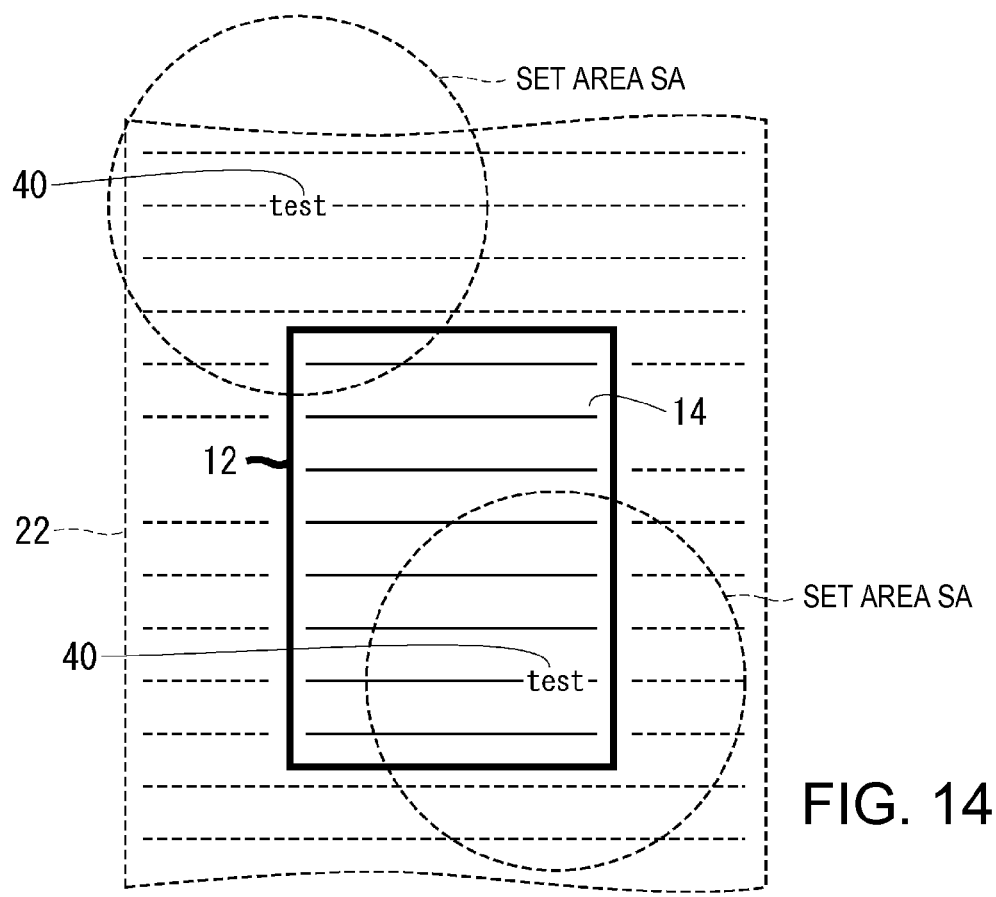
FIG. 14 is a diagram showing a specific display embodiment of the touch scroll processing.
Figure 15:
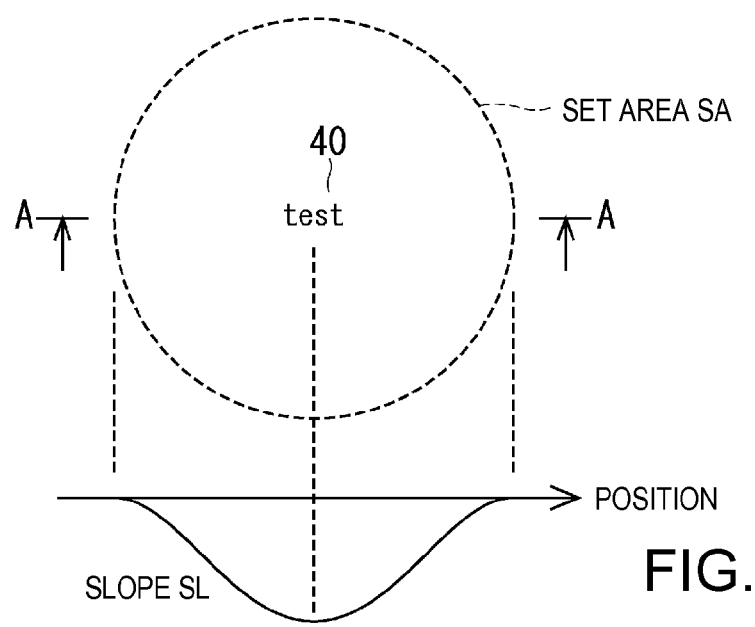
FIG. 15 is a diagram illustrating the shape of a slope for a set area SA.
Figure 16:
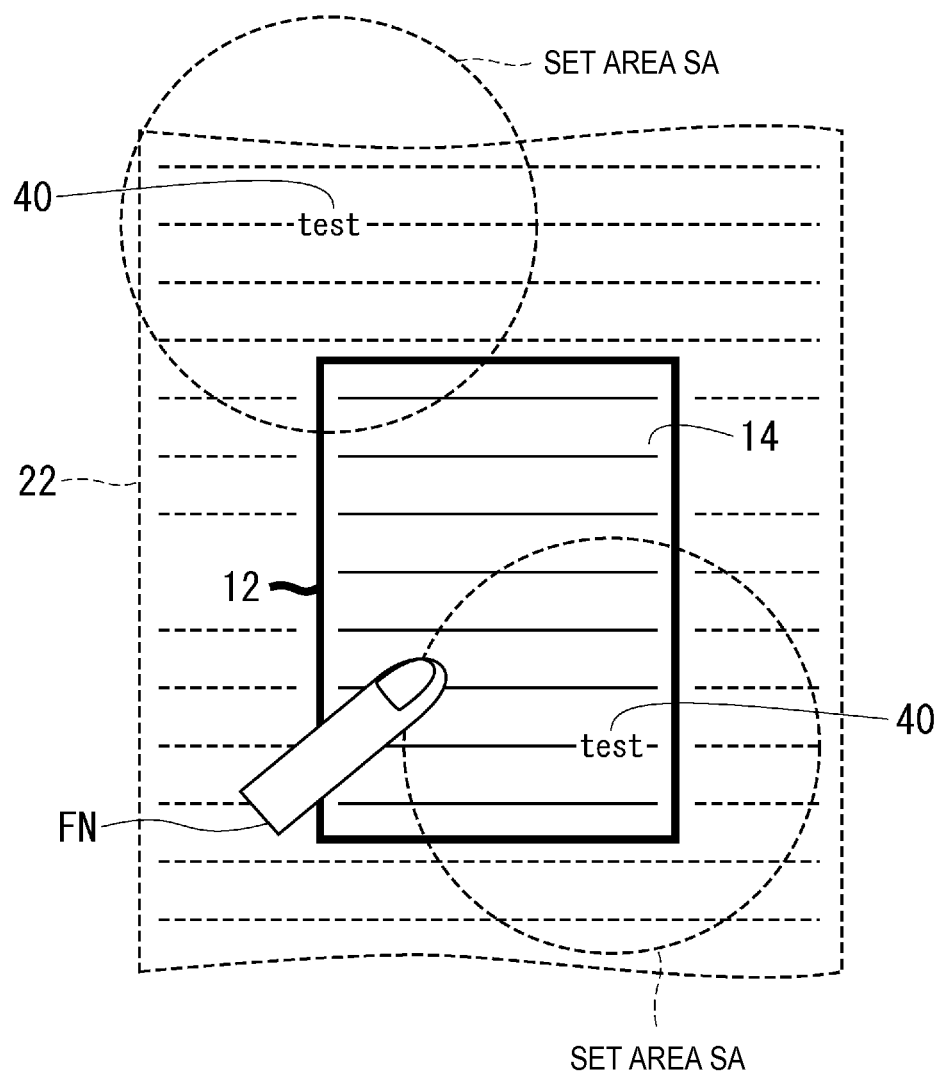
FIG. 16 is a diagram showing the specific display embodiment of the touch scroll processing.
Figure 17:
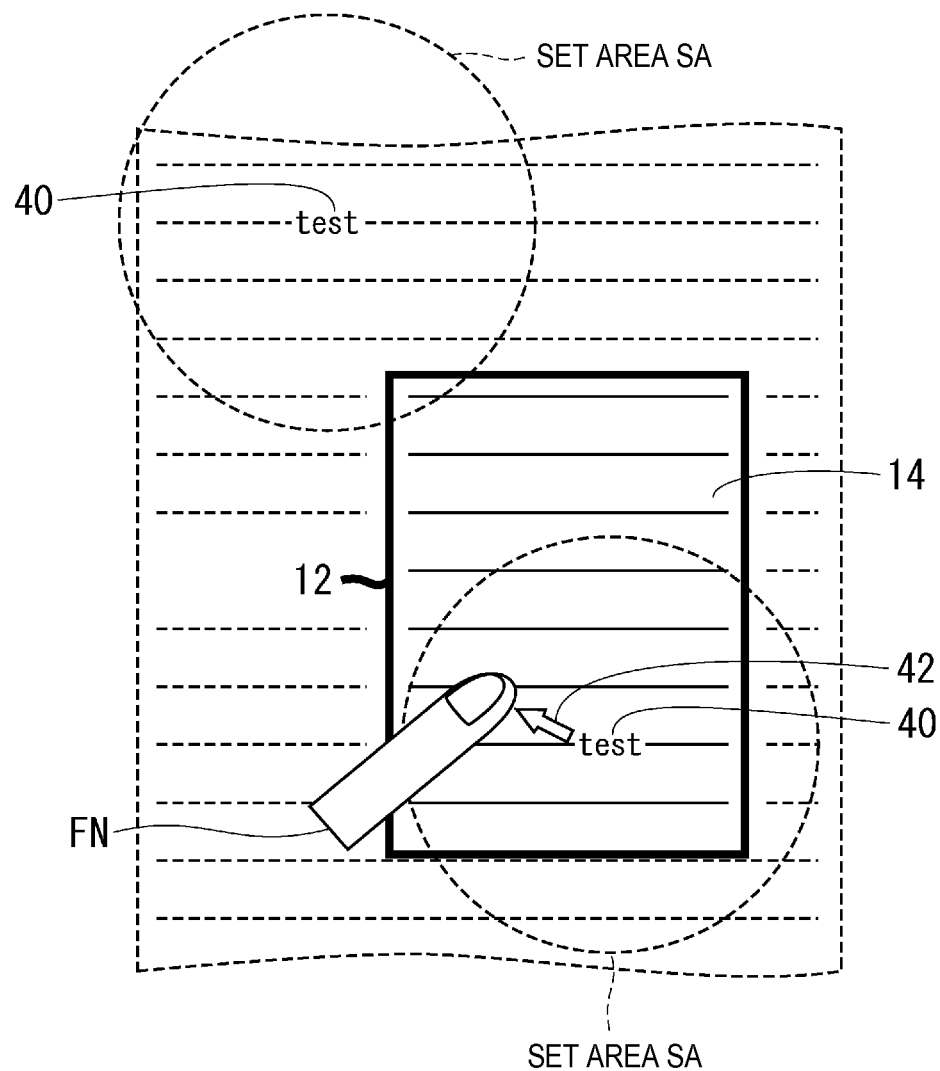
FIG. 17 is a diagram showing the specific display embodiment of the touch scroll processing.

FIGS. 14, 16, and 17 are diagrams showing a specific display embodiment of the touch scroll processing. FIG. 15 is a diagram illustrating the shape of the slope for the set area SA. The upper portion of FIG. 15 shows a plan view of the set area SA, and the lower portion is a vertical cross-sectional view along a line A-A in the upper portion.

With reference to FIGS. 14 to 17, an example will be described in which the speed setting unit 18 sets each area containing the user's search word 40 as the set area SA, and sets the area acceleration AA for the set area SA. In the embodiment of FIGS. 14 to 17, the target image 22 has a size extending off the display unit 12 in the longitudinal and lateral directions. The display control unit 16 scrolls the target image 22 not only in the longitudinal directions of the display unit 12 but also in the directions crossing the longitudinal directions, i.e., in the lateral directions and the directions oblique to the longitudinal directions of the display unit 12.

As shown in FIG. 14, the target image 22 may be text that contains characters over a number of lines. The operation input unit 14 receives the search word 40, for example "test," from the user and searches the text of the target image 22. The target image 22 contains multiple instances of "test." Alternatively, if the display apparatus 10 obtains the target image 22 from a server apparatus via, e.g., the Internet, the server apparatus may search for the search word 40.

The speed setting unit 18 obtains the positions of the search word 40 in the target image 22 based on the image information on the target image 22. Alternatively, if a server apparatus searches for the search word 40, the speed setting unit 18 may obtain the positions of the search word 40 from the server apparatus. The speed setting unit 18 sets each set area SA covering the search word 40. The speed setting unit 18 sets the set area SA even for the search word 40 not displayed on the display unit 12. Each set area may be partially inside or outside the display unit 12.

As shown in the upper portion of FIG. 15, an exemplary shape of the set area SA is a circle as viewed from the user, where the center of the circle is the centroid of the search word 40. As shown in the lower portion of FIG. 15, the speed setting unit 18 sets, within the set area SA, the slope SL indicating the area acceleration AA. Specifically, the speed setting unit 18 sets the slope SL so that the vertical cross-sectional view along a line through the center of the set area SA has the shape shown in the lower portion of FIG. 15. That is, the speed setting unit 18 sets the slope SL associated with the set area SA to have a substantially conical shape, which is concave as viewed from the user. In other words, the speed setting unit 18 sets the area acceleration AA that accelerates the search word 40 toward an area where a touch operation has been received. Alternatively, if a server apparatus searches for the search word 40, the server apparatus may set the set area SA and the area acceleration AA.

The speed setting unit 18 thus sets the set area SA and the area acceleration AA as shown in FIGS. 14 and 15. Then the operation input unit 14 receives a touch operation of the user touching the operation input unit 14 with the tip of the user's finger FN, as shown in FIG. 16. The speed setting unit 18 obtains the coordinate of the area of the touch operation from the operation input unit 14. If the speed setting unit 18 determines that the touch operation area is within the set area SA, the speed setting unit 18 extracts the area acceleration AA for the touch operation area from the slope SL shown in the lower portion of FIG. 15 and sets the extracted area acceleration AA. The speed setting unit 18 sets the initial speed FV of the scroll according to the extracted area acceleration AA. As shown in FIG. 17, the display control unit 16 scrolls the target image 22 based on the initial speed FV set by the speed setting unit 18. Thus, the target image 22 is scrolled along an arrow 42 so that the search word 40 approaches the touch operation area. When the display control unit 16 further scrolls the search word 40 to the touch operation area, i.e., under the finger FN, the vertex of the slope SL reaches the touch operation area to cause the direction of the slope SL to be reversed. Accordingly, the speed setting unit 18 determines that the direction of the area acceleration AA has changed and sets the scroll speed SV to "0." The display control unit 16 stops the scroll of the target image 22 so that the search word 40 is substantially in the touch operation area. The speed setting unit 18 may also shift the position where the slope SL is extracted with respect to the touch operation area. For example, the speed setting unit 18 may set the area acceleration AA by extracting the slope SL at a position slightly shifted toward the search word from the touch operation area. In this manner, the direction of the area acceleration AA changes before the search word 40 reaches the touch operation area, so that the display apparatus 10 can prevent the search word 40 from being hidden by the finger FN.

Figure 18:
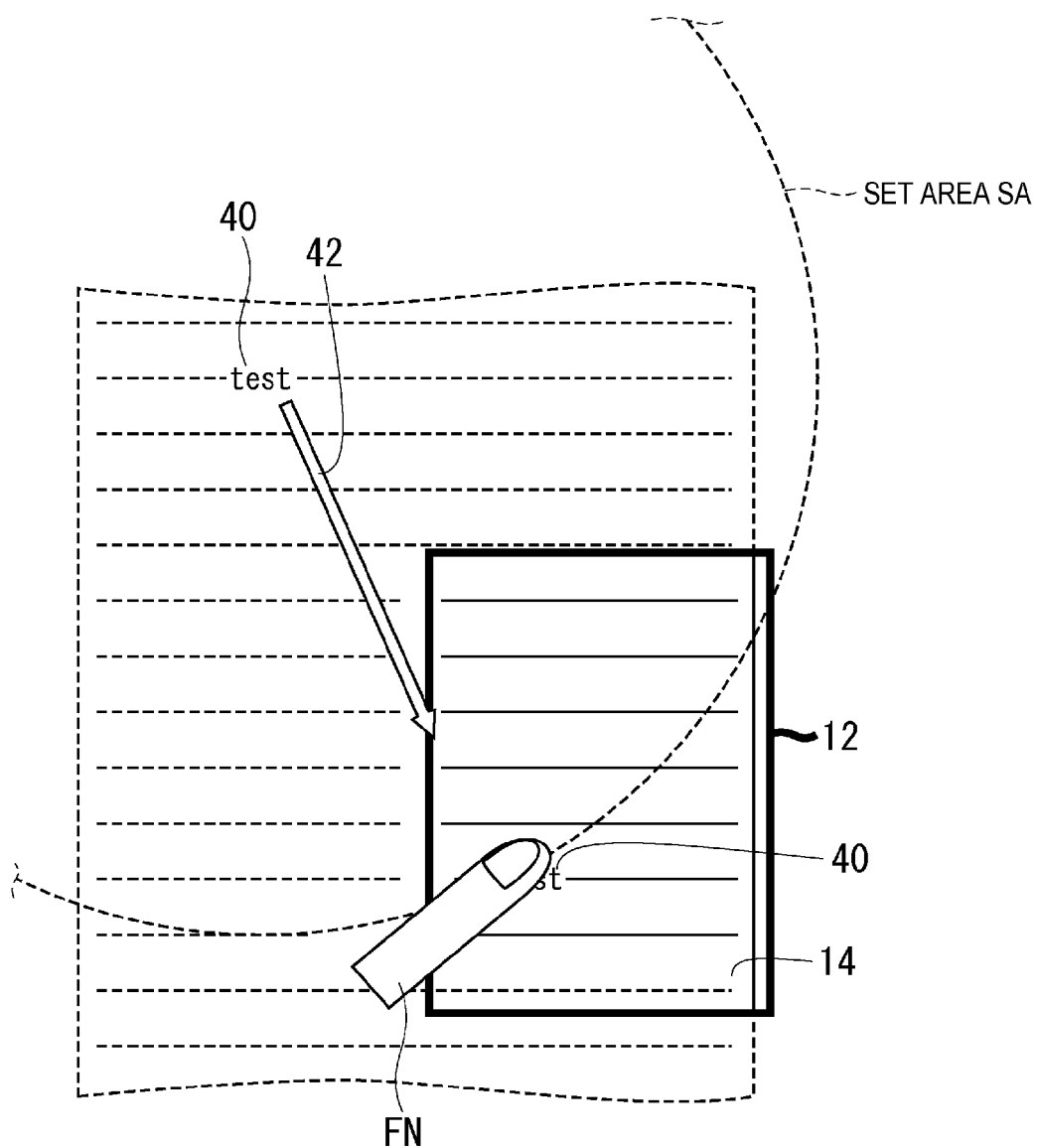
FIG. 18 is a diagram illustrating another scroll state after the state in FIG. 17.

FIG. 18 is a diagram illustrating another scroll state after the state in FIG. 17. In the example shown in FIG. 18 after the state shown in FIG. 17, when the search word 40 reaches the touch operation area, the speed setting unit 18 deletes the set area SA overlapping the touch operation area. The speed setting unit 18 then detects the position of the search word 40 closest to the touch operation area next. The speed setting unit 18 expands the set area SA for the detected next search word 40 to include the touch operation area. The speed setting unit 18 extracts the area acceleration AA from the slope SL for the expanded set area SA, and sets the scroll speed SV that accelerates the next search word 40 toward the touch operation area. Accordingly, the display control unit 16 scrolls the target image 22 along an arrow 42 so that the next search word 40 approaches the touch operation area.

As described above, in the display apparatus 10, the speed setting unit 18 sets the scroll acceleration according to the area acceleration AA set to be associated with the set area SA. This allows the display control unit 16 to scroll while gradually and continuously changing the scroll speed SV near the set area SA. As a result, the display apparatus 10 can scroll the target image 22 while reducing the uncomfortable feeling of the user looking at the target image 22 being scrolled.

Figure 19:
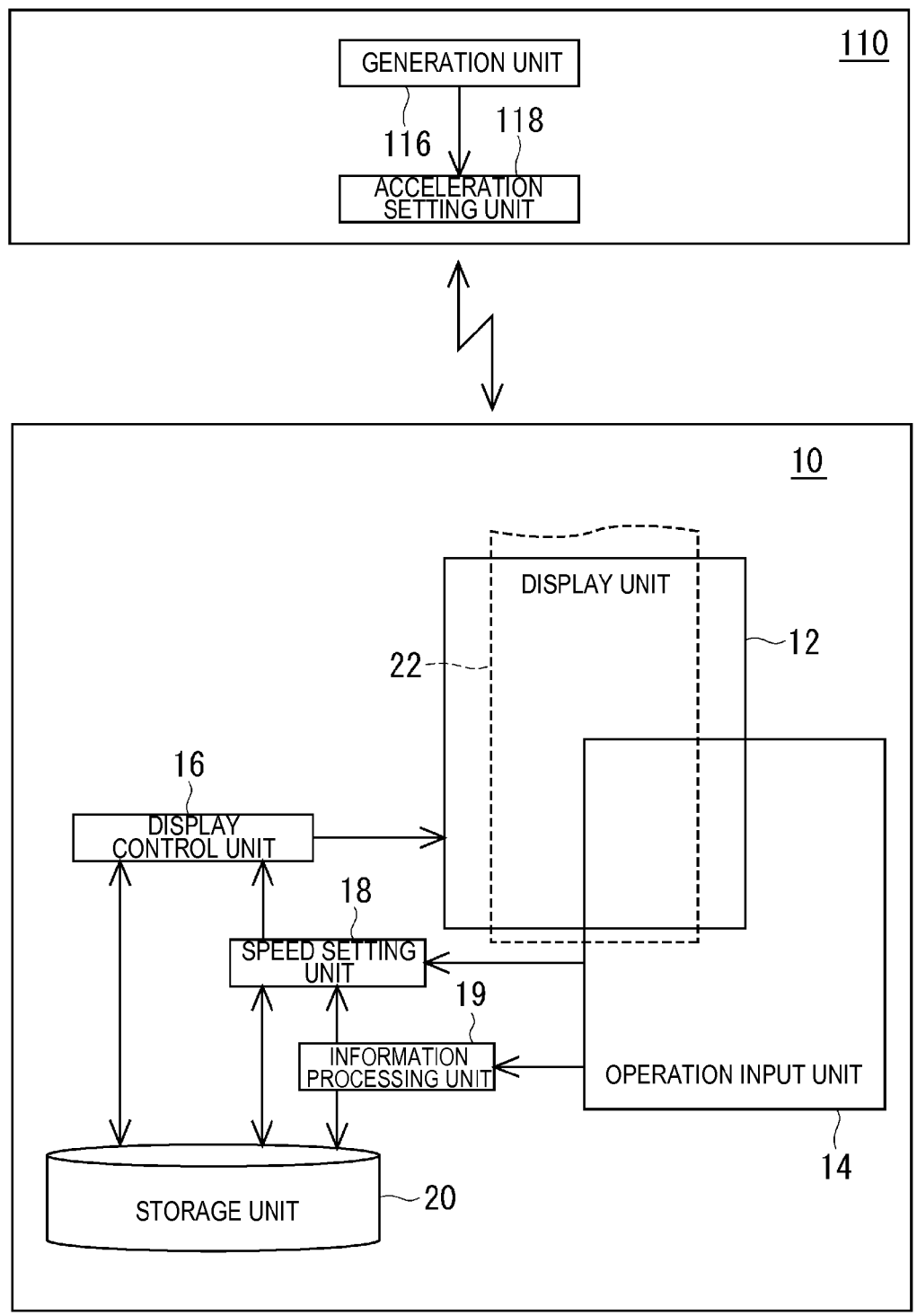
FIG. 19 is an overall configuration diagram of a server apparatus according to an embodiment of the present invention.

FIG. 19 is an overall configuration diagram of a server apparatus 110 according to an embodiment. As shown in FIG. 19, the server apparatus 110 includes a generation unit 116 and an acceleration setting unit 118. The generation unit 116 generates the target image 22. The acceleration setting unit 118 sets the set area SA in the target image 22 generated by the generation unit 116. The acceleration setting unit 118 sets, for the set area SA, the area acceleration AA for changing the scroll speed SV of the target image 22. The setting of the area acceleration AA is substantially the same as the setting of the area acceleration AA by the speed setting unit 18. The generation unit 116 and the acceleration setting unit 118 send the generated target image 22 along with the set area SA and the area acceleration AA set as above via, e.g., the Internet. The display apparatus 10 can receive the target image 22 along with the set area SA and the area acceleration AA, thereby scrolling the target image 22 while reducing the user's uncomfortable feeling. The set area SA and the area acceleration AA may also be set by the user on the server apparatus 110. Further, the set area SA and the area acceleration AA may be set by, e.g., a browser on the display apparatus that obtains the target image 22 from the server apparatus 110. For example, if the browser searches the target image 22 for a search word, the browser may set the set area SA and the area acceleration AA for each position of the search word.

The shapes of components, connection relationships, values such as the number of elements, and the content of the target image 22 in the above embodiments may be changed as appropriate. Any of the embodiments may also be combined with one or more other embodiments.

For example, the speed setting unit 18 may change the scroll speed SV according to the area acceleration AA that varies with changes in the scroll speed SV. Specifically, if the area acceleration AA is set to be decelerated for a flick operation, the speed setting unit 18 may change the scroll speed SV according to the area acceleration AA whose absolute value is proportional to the absolute value of the scroll speed SV. The speed setting unit 18 may set the area acceleration AA that satisfies this condition. Further, the speed setting unit 18 may set the area acceleration AA that varies differently in the forward direction and the backward direction of the scroll speed SV with respect to the judgment area JA. The forward direction is an example of one scroll direction. For example, the speed setting unit 18 may set the gradient of the slope SL up to when the central portion of the set area SA passes the judgment area JA as a sharper or gentler gradient than the reverse gradient of the slope SL after the central portion of the set area SA passes the judgment area JA. The speed setting unit 18 then computes and changes the scroll speed SV according to the area acceleration AA that varies differently in the forward direction and the backward direction. Thus, the display control unit 16 can provide natural scroll when the set area SA passes the judgment area JA, thereby reducing the user's uncomfortable feeling for the scroll.

The speed setting unit 18 may change the scroll speed SV according to the area acceleration AA set for the set area SA in the target image 22 so that the set area SA stops within the display unit 12. The speed setting unit 18 may set the area acceleration AA that satisfies this condition.

The set area SA for which the area acceleration AA is set may be displayed by the display control unit 16 on the display unit 12 differently from areas other than the set area SA. For example, in the example shown in FIG. 14, the display control unit 16 may display the set area SA to be lightly colored inside.

While the above embodiments take the examples in which the display control unit 16 stops the scroll when the direction of the scroll speed SV changes, this is not limiting. For example, the display control unit 16 may control the scroll to continue until the scroll speed SV becomes "0" or until the magnitude, i.e., the absolute value, of the scroll speed SV becomes equal to or smaller than a predetermined threshold. In that case, the target image 22 will swing up and down relative to the judgment area JA. The display control unit 16 may also control the scroll to stop when the direction of the area acceleration AA changes.

The above embodiments describe the cases that the speed setting unit 18 sets the set area SA and the area acceleration AA. However, the set area SA and the area acceleration AA may be associated with the target image 22 in advance.

The above embodiments for a flick operation may be applied to embodiments for a touch operation. Conversely, the above embodiments for a touch operation may be applied to embodiments for a flick operation.

For example, the above embodiment shown in FIGS. 5 to 8 illustrates the example in which the scroll speed SV for the telephone number field 31 containing incorrect input information is changed in response to a flick operation. However, the scroll speed SV may be changed in response to a touch operation. In that case, the operation input unit 14 receives a touch operation. In response to the operation input unit 14 receiving the touch operation within the set area SA, the speed setting unit 18 sets the scroll speed according to the area acceleration AA that accelerates toward the telephone number field 31 containing the incorrect input information. An example of the slope SL indicating the area acceleration AA in this case has a concave shape centered on the telephone number field 31.

The above embodiments illustrate the examples in which the slope SL, i.e., the area acceleration AA, is deleted when the scroll is stopped. However, the timing of deleting the area acceleration AA may be set as appropriate. For example, the speed setting unit 18 may delete the area acceleration AA when the center of the judgment area JA aligns with the center of the set area SA. In the embodiment shown in FIGS. 5 to 8, the speed setting unit 18 may delete the area acceleration AA when the input information is corrected.

The above embodiments illustrate the examples in which the speed setting unit 18 sets the area acceleration AA based on the slope SL. However, the area acceleration AA may be set based on factors other than the slope. For example, the speed setting unit 18 may set the area acceleration AA based on virtual attraction, gravitation, electromagnetic force, repulsion, or a combination thereof, associated with coordinates in the set area SA. The speed setting unit 18 may also set the area acceleration AA based on a linear or quadratic function associated with coordinates in the set area SA.

The speed setting unit 18 may compute the scroll speed SV according to the area acceleration AA that dynamically varies with the scroll. The speed setting unit 18 may change the area acceleration AA with the scroll. For example, when one set area SA passes the judgment area JA with the scroll, the speed setting unit 18 may change the area acceleration AA for another set area SA. The speed setting unit 18 may also change the area acceleration AA in response to changes in the scroll speed, or changes in the position of the set area SA relative to the display unit 12 or the judgment area JA, with the scroll. Further, when one set area SA or the center thereof passes the judgment area JA, the speed setting unit 18 may modify another set area SA. An example of modifying another set area SA is expanding the other set area SA so that at least part of the other set area SA is included in the judgment area JA.

Figure 20:
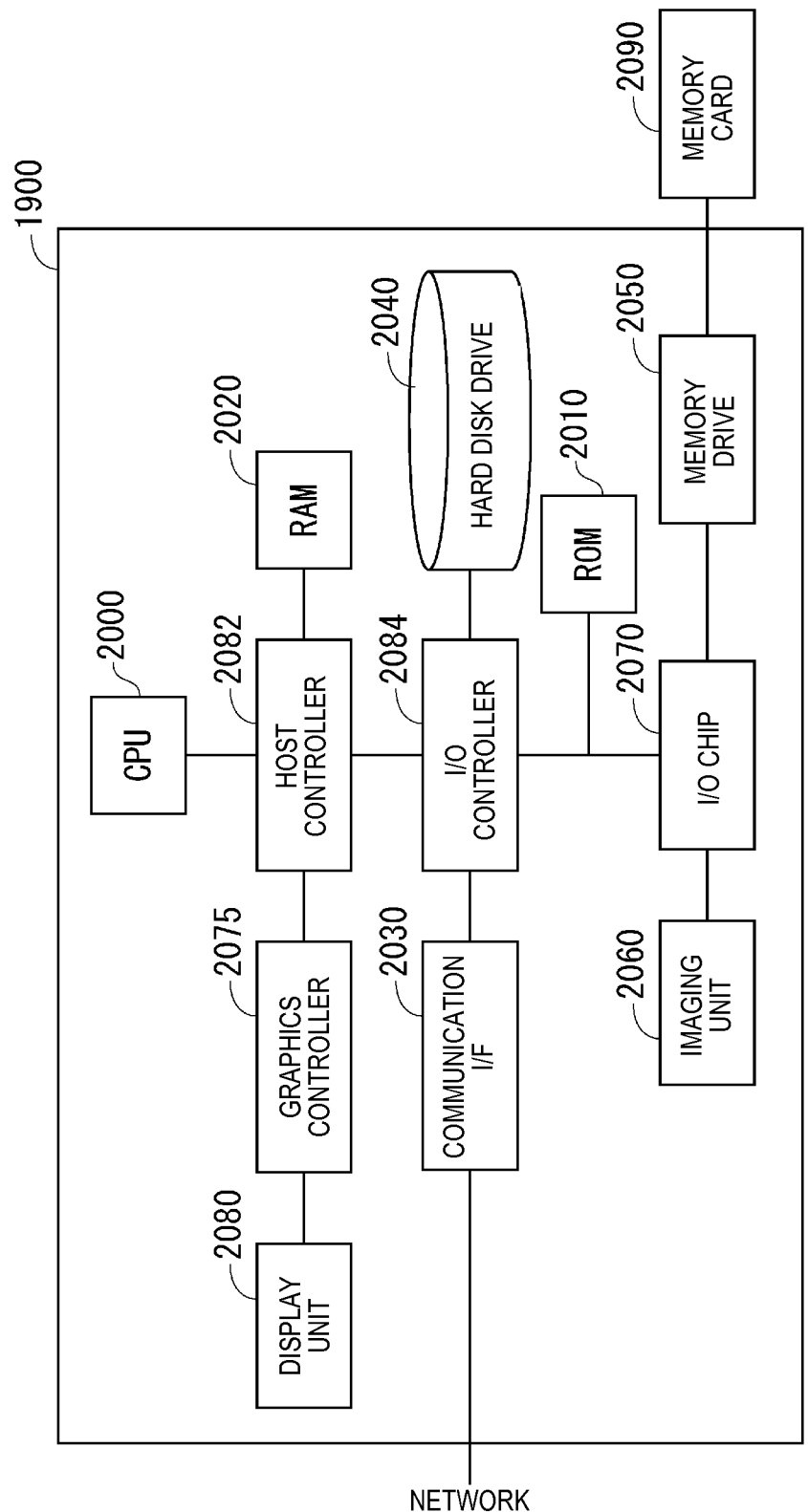
FIG. 20 shows an exemplary hardware configuration of a computer according to an embodiment of the present invention.

FIG. 20 shows an exemplary hardware configuration of a computer 1900 according to an embodiment. The computer 1900 according to the embodiment is an example of the information processing unit. The computer 1900 includes: a CPU peripheral section including a CPU 2000, a RAM 2020, a graphics controller 2075, and a display unit 2080 connected with each other by a host controller 2082; an I/O section including a communication interface 2030 and a hard disk drive 2040 connected to the host controller 2082 by an I/O controller 2084; and a legacy I/O section including a ROM 2010, a memory drive 2050, an imaging unit 2060, and an I/O chip 2070 connected to the I/O controller 2084.

The host controller 2082 connects the RAM 2020 with the CPU 2000 and the graphics controller 2075, which accesses the RAM 2020 at high transfer rates. The CPU 2000 operates based on programs stored in the ROM 2010 and the RAM 2020 and controls each section. The graphics controller 2075 obtains image data generated by a component such as the CPU 2000 on a frame buffer provided in the RAM 2020, and causes the image data to be displayed on the display unit 2080. Alternatively, the graphics controller 2075 may include therein the frame buffer for storing image data generated by a component such as the CPU 2000.

The I/O controller 2084 connects the host controller 2082 with the communication interface 2030 and the hard disk drive 2040, which are relatively high-speed I/O devices. The communication interface 2030 communicates with other devices via a network. The hard disk drive 2040 stores programs and data, such as a display program, used by the CPU 2000 in the computer 1900.

The ROM 2010, and relatively low-speed I/O devices, such as the memory drive 2050, the imaging unit 2060, and the I/O chip 2070, are also connected to the I/O controller 2084. The ROM 2010 stores a boot program executed by the computer 1900 upon startup, and/or programs that depend on hardware of the computer 1900. The memory drive 2050 reads programs or data, e.g., the display program, from a memory card 2090 and provides the programs or data to the hard disk drive 2040 via the RAM 2020. The I/O chip 2070 connects the imaging unit 2060 and the memory drive 2050 to the I/O controller 2084, and connects various I/O devices to the I/O controller 2084 via, for example, a parallel port, a serial port, a keyboard port, and a mouse port.

Programs provided to the hard disk drive 2040 via the RAM 2020 are provided by a user, being stored in a recording medium, such as the memory card 2090 or an IC card. The programs such as the display program are read from the recording medium, installed into the hard disk drive 2040 in the computer 1900 via the RAM 2020, and executed in the CPU 2000.

A program installed into the computer 1900 to cause the computer 1900 to function as the display apparatus 10 includes a position detection unit module, a determination unit module, an identification unit module, a database search unit module, an update unit module, a path search unit module, and a display processing unit module. The program or modules operate on components such as the CPU 2000 to cause the computer 1900 to function as the display unit 12, the operation input unit 14, the display control unit 16, the speed setting unit 18, and the information processing unit 19.

When read into the computer 1900, information processing described in the program functions as the display unit 12, the operation input unit 14, the display control unit 16, the speed setting unit 18, and the information processing unit 19, which are specific means implemented by cooperation of software and the above-described various hardware resources. These specific means are used to provide information operation or processing depending on the intended use of the computer 1900 in the embodiments, thereby constructing the particular display apparatus 10 for the intended use.

As an example, for communication between the computer 1900 and an external device, the CPU 2000 executes a communication program loaded onto the RAM 2020 and, based on processing details described in the communication program, instructs the communication interface 2030 to process communication. Under the control of the CPU 2000, the communication interface 2030 reads transmission data stored in, e.g., a transmission buffer area provided in a storage device, such as the RAM 2020, the hard disk drive 2040, or the memory card 2090, to send the transmission data to the network. The communication interface 2030 also writes reception data received from the network to, e.g., a reception buffer area provided in the storage device. In this manner, the communication interface 2030 may transfer the transmission/reception data to and from the storage device using a DMA (direct memory access) scheme. Alternatively, the CPU 2000 may transfer the transmission/reception data by reading data from the transferring storage device or communication interface 2030 and writing data to the receiving storage device or communication interface 2030.

The CPU 2000 also loads onto the RAM 2020 all or necessary part of files or databases stored in an external storage device, such as the hard disk drive 2040 or the memory drive 2050 (the memory card 2090), using, e.g., DMA transfer, thereby performing various sorts of processing on the data on the RAM 2020. The CPU 2000 then writes back the processed data to the external storage device using, e.g., DMA transfer. In this processing, the RAM 2020 may be considered as a temporal storage of the data in the external storage device, so that the RAM 2020 and the external storage device are collectively referred to as memory, a storage unit, a storage device, etc., in the embodiments. Various types of information in the embodiments, such as various programs, data, tables, and databases, are stored in such a storage device and subjected to information processing. The CPU 2000 may also hold part of dada of the RAM 2020 in cache memory and read and write on the cache memory. Also in such a case, the cache memory performs part of functions of the RAM 2020, so that the cache memory is considered to be included in the RAM 2020, memory, and/or a storage device in the embodiments unless otherwise stated.

The CPU 2000 performs, on data read from the RAM 2020, various sorts of processing specified by an instruction sequence of a program and described in the embodiments, including various computations, information processing, conditional decision, and information search and replacement, and then writes the processed data back to the RAM 2020. For example, when the CPU 2000 performs conditional decision, the CPU 2000 first determines whether any of various variables described in the embodiments satisfies a condition that the variable be greater than, smaller than, not smaller than, not greater than, or equal to another variable or constant. If the condition is satisfied (or not satisfied), the CPU 2000 branches to a different instruction sequence or calls a subroutine.

The CPU 2000 can search information stored in files or databases in a storage device. For example, consider the case that a storage device stores entries that associate attribute values of a first attribute with corresponding attribute values of a second attribute. The CPU 2000 retrieves, out of the entries stored in the storage device, an entry having an attribute value of the first attribute satisfying a specified condition, and reads an attribute value of the second attribute stored for the retrieved entry. Thus, the CPU 2000 can obtain the attribute value of the second attribute associated with the attribute value of the first attribute satisfying the certain condition.

The programs or modules described above may be stored in an external recording medium. The recording medium may be the memory card 2090, as well as an optical recording medium such as a DVD or CD, a magneto-optical recording medium such as an MO, a tape medium, or semiconductor memory such as an IC card. The recording medium may also be a storage device such as a hard disk or RAM provided in a server system connected to a dedicated communication network or the Internet, and the programs may be provided to the computer 1900 via the network.

As described herein, a first aspect of the present invention provides an apparatus including: a display unit displaying a target image; an operation input unit to which a scroll operation for scrolling the target image displayed on the display unit is input; a display control unit scrolling the target image according to the scroll operation; and a speed setting unit changing, according to an area acceleration associated with a set area provided in the target image, a scroll speed at which the target image is scrolled.

A second aspect of the present invention provides an apparatus including: a generation unit generating a target image; and an acceleration setting unit setting a set area in the target image and setting an area acceleration for the set area for changing a scroll speed at which the target image is scrolled.

The above summary of the invention does not list all of necessary features of the present invention. Sub-combinations of the group of features may also be included in the present invention.

While the present invention has been described with reference to the embodiments, the technical scope of the present invention is not limited to what has been described in the above embodiments. It is apparent to those skilled in the art that various modifications or improvements may be made to the above embodiments. It is also apparent from the claims that embodiments with such modifications or improvements may be included in the technical scope of the present invention.

It is to be noted that the processing, such as operations, procedures, steps, and stages, in the devices, systems, programs, and methods described in the claims, specification, and drawings may be implemented in any order unless specified with a term such as "before" or "prior to" or unless output of an earlier process is used in a later process. Although operation flows in the claims, specification, and drawings may be described using a term such as "first" or "next" for convenience of description, it does not mean that the operation flows should be carried out in the described order.

What is claimed is:

1. An apparatus comprising:
a display unit displaying a target image;
an operation input unit to which a scroll operation for scrolling the target image displayed on the display unit is input, wherein the scroll operation is used to set a future speed for scrolling through a set area in the target image;
a display control unit scrolling the target image according to the future speed set by the scroll operation; and
a speed setting unit changing, according to area accelerations associated with set areas provided in the target image, a scroll speed at which each of the set areas in the target image is scrolled, wherein the scroll speed is selectively fixed for each of the set areas of the target image by a different scroll operation input into the operation input unit, wherein
the operation input unit receives a flick operation as the scroll operation, wherein the flick operation defines an initial acceleration for a particular set area, and
the speed setting unit sets a speed corresponding to the flick operation as an initial speed of the scroll speed, and changes the scroll speed for the particular set area according to the initial acceleration that decelerates the scroll speed of the particular set area, wherein the scroll speed for the particular set area is decelerated by a sum of an area acceleration associated with the particular set area plus the initial acceleration defined by the flick operation.

2. The apparatus according to claim 1, wherein
the speed setting unit changes the scroll speed according to the initial acceleration and the area acceleration in response to the particular set area entering an area where the flick operation has been input on the operation input unit.

3. The apparatus according to claim 1, wherein
the operation input unit receives a touch operation, and
the speed setting unit sets an initial speed of the scroll speed according to the area acceleration in response to an area where the touch operation being received on the operation input unit is within the set area.

4. The apparatus according to claim 3, wherein
the speed setting unit changes the scroll speed according to the area acceleration in response to the touch operation continuing within the set area.

5. The apparatus according to claim 1, wherein
the display control unit detects the scrolling direction of the target image changing from a first direction to a second direction, and
the speed setting unit, in response to the display control unit detecting the scrolling direction of the target image changing from the first direction to the second direction, stops any scrolling of the target image by setting the scroll speed to zero.

6. The apparatus according to claim 1, wherein a video is displayed on the display unit, wherein the speed setting unit decreases the scroll speed from a beginning of the video displayed on the display unit to a judgment area on the video, wherein the judgment area identifies an area in the video, and wherein the speed setting unit increases the scroll speed from the judgment area to an end of the video.

7. The apparatus according to claim 6, wherein
in response to reception of the flick operation by the operation input unit, the speed setting unit changes the scroll speed according to an area acceleration that decelerates a field containing incorrect input information.

8. The apparatus according to claim 6, wherein
the operation input unit receives a touch operation, and
in response to reception of the touch operation by the operation input unit, the speed setting unit sets the scroll speed according to an area acceleration that accelerates toward a field containing incorrect input information.

9. The apparatus according to claim 1, wherein
the operation input unit receives input of a search object in the target image, and
the speed setting unit changes the scroll speed according to an area acceleration associated with the set area covering the search object in the target image, wherein the display is a touch screen, wherein scrolling the target image is performed by a user's touch of the touch screen, and wherein the scroll speed decreases to zero before the user's touch reaches the search object in order to allow the search object to remain being visible on the display unit.

10. The apparatus according to claim 9, wherein
the operation input unit receives a touch operation, and
the speed setting unit sets the scroll speed according to an area acceleration that accelerates the search object toward an area where the touch operation has been received on the display unit.

11. The apparatus according to claim 1, wherein
the display control unit causes the display unit to display the target image containing an advertisement, and
the speed setting unit changes the scroll speed according to an area acceleration that decelerates the advertisement within the display unit.

12. The apparatus according to claim 1, wherein
the display control unit causes the display unit to display a separation area that separates the target image into a plurality of areas, and
the speed setting unit changes the scroll speed according to an area acceleration that decelerates the separation area within the display unit.

13. The apparatus according to claim 1, wherein
if an area acceleration is set to be decelerated for the flick operation, the speed setting unit changes the scroll speed according to the area acceleration whose absolute value is proportional to the absolute value of the scroll speed.

14. The apparatus according to claim 1, wherein
the speed setting unit changes the scroll speed according to an area acceleration for the set area such that the set area in the target image stops within the display unit.

15. The apparatus according to claim 1, wherein
the display control unit causes the display unit to display the set area for which an area acceleration is set so that the set area is displayed differently from areas other than the set area.

16. The apparatus according to claim 1, wherein
the speed setting unit changes the scroll speed according to an area acceleration including one acceleration for one scroll direction and another acceleration for a scroll direction opposite to the one scroll direction.

17. The apparatus according to claim 1, wherein
the speed setting unit changes the scroll speed according to an area acceleration varying with scroll.

18. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:
program instructions to display a target image on a display unit;
program instructions to receive an input describing a scroll operation for scrolling the target image displayed on the display unit, wherein the scroll operation is used to set a future speed for scrolling through a set area in the target image;
program instructions to detect incorrect information in a field in the target image;
program instructions to change, according to area accelerations associated with set areas provided in the target image, a scroll speed at which each of the set areas in the target image is scrolled, wherein the scroll speed is selectively fixed for each of the set areas of the target image by a different scroll operation input into the operation input unit, and wherein the scroll speed is changed in response to the field containing the incorrect input information;
program instructions to receive a flick operation as the scroll operation, wherein the flick operation defines an initial acceleration for a particular set area; and
program instructions to set a speed corresponding to the flick operation as an initial speed of the scroll speed, and change the scroll speed for the particular set area according to the initial acceleration that decelerates the scroll speed of the particular set area, wherein the scroll speed for the particular set area is decelerated by a sum of an area acceleration associated with the particular set area plus the initial acceleration defined by the flick operation.

19. A computer program product for adjusting scroll speed on a display unit, the computer program product comprising a computer readable storage device having program code embodied therewith, wherein the computer readable storage device is hardware, and wherein the program code is readable and executable by a processor to perform a method comprising:

displaying a target image on a display unit;
   receiving an input describing a scroll operation for scrolling the target image displayed on the display unit, wherein the scroll operation is used to set a future speed for scrolling through a set area in the target image;
   detecting incorrect information in a field in the target image;
   changing, according to area accelerations associated with set areas provided in the target image, a scroll speed at which each of the set areas the target image is scrolled, wherein the scroll speed is selectively fixed for each of the set areas of the target image by a different scroll operation input into the operation input unit, and wherein the scroll speed is changed according to the field containing the incorrect input information;
   receiving a flick operation as the scroll operation, wherein the flick operation defines an initial acceleration for a particular set area; and
   setting a speed corresponding to the flick operation as an initial speed of the scroll speed, and changing the scroll speed for the particular set area according to the initial acceleration that decelerates the scroll speed of the particular set area, wherein the scroll speed for the particular set area is decelerated by a sum of an area acceleration associated with the particular set area plus the initial acceleration defined by the flick operation.

* * * * *